(12) United States Patent
Iida et al.

(10) Patent No.: US 11,891,544 B2
(45) Date of Patent: Feb. 6, 2024

(54) PRESSURE SENSITIVE ADHESIVE PARTICLES, METHOD FOR PRODUCING PRINTED MATERIAL, AND PRINTED MATERIAL

(71) Applicant: FUJIFILM Business Innovation Corp., Tokyo (JP)

(72) Inventors: Yoshifumi Iida, Kanagawa (JP);
Sachiko Nishioka, Kanagawa (JP);
Takashi Hasegawa, Kanagawa (JP);
Hajime Sugahara, Kanagawa (JP);
Satomi Kashiwagi, Kanagawa (JP);
Yuka Zenitani, Kanagawa (JP); Satoshi Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 337 days.

(21) Appl. No.: 17/003,947

(22) Filed: Aug. 26, 2020

(65) Prior Publication Data
US 2021/0277291 A1 Sep. 9, 2021

(30) Foreign Application Priority Data

Mar. 9, 2020 (JP) .................................. 2020-040306

(51) Int. Cl.
| | | |
|---|---|---|
| *C09J 125/06* | (2006.01) | |
| *C09J 133/10* | (2006.01) | |
| *C09J 133/02* | (2006.01) | |
| *B41M 7/00* | (2006.01) | |
| *C09J 7/38* | (2018.01) | |

(Continued)

(52) U.S. Cl.
CPC .......... *C09J 125/06* (2013.01); *B41M 7/0027* (2013.01); *C09J 7/385* (2018.01);
(Continued)

(58) Field of Classification Search
None
See application file for complete search history.

(56) References Cited

U.S. PATENT DOCUMENTS 5,250,382 A * 10/1993 Shimojo ............ G03G 9/08797
430/109.3
8,679,718 B2 3/2014 Sugiura
(Continued)

FOREIGN PATENT DOCUMENTS

| JP | H09-62033 A | * | 7/1997 |
| JP | 2007229993 | | 9/2007 |

(Continued)

OTHER PUBLICATIONS

Machine translation JPH09-62033A (Espace.net). (Year: 1997).*
Machine translaiton JP-2018163256-A (Year: 2023).*

*Primary Examiner* — Alexandre F Ferre
(74) *Attorney, Agent, or Firm* — JCIPRNET

(57) ABSTRACT

A pressure sensitive adhesive particle includes a pressure sensitive adhesive base particle that contains a styrene resin containing styrene and a vinyl monomer other than styrene as polymerization components, and a (meth)acrylate resin containing at least two (meth)acrylates as polymerization components, in which a mass ratio of the (meth)acrylates relative to a total of polymerization components of the (meth)acrylate resin is 90 mass % or more; and an external additive. The pressure sensitive adhesive particle has a surface having an arithmetic average roughness Ra within a range of 0.005 μm to 0.100 μm. The pressure sensitive adhesive particle has at least two glass transition temperatures, and the difference between the lowest glass transition temperature and the highest glass transition temperature among the glass transition temperatures of the pressure sensitive adhesive particle is 30° C. or more.

21 Claims, 3 Drawing Sheets

(51) Int. Cl.
  *C09J 125/14* (2006.01)
  *C09J 133/08* (2006.01)
  *C08K 3/36* (2006.01)
  *C08K 3/22* (2006.01)

(52) U.S. Cl.
  CPC ........... *C09J 125/14* (2013.01); *C09J 133/02* (2013.01); *C09J 133/08* (2013.01); *C09J 133/10* (2013.01); *C08K 3/22* (2013.01); *C08K 3/36* (2013.01); *C08K 2003/2237* (2013.01); *C08K 2003/2241* (2013.01); *C08L 2207/53* (2013.01); *C09J 2301/21* (2020.08); *C09J 2301/302* (2020.08); *C09J 2301/312* (2020.08); *C09J 2301/408* (2020.08); *C09J 2425/00* (2013.01); *C09J 2433/00* (2013.01)

(56) References Cited

U.S. PATENT DOCUMENTS

| | | | |
|---|---|---|---|
| 9,594,324 | B2 | 3/2017 | Tamagaki et al. |
| 9,658,546 | B2 | 5/2017 | Tanaka et al. |
| 2005/0026065 | A1* | 2/2005 | Onuma ................ G03G 9/0817 430/108.1 |
| 2009/0226834 | A1* | 9/2009 | Matsumura .......... G03G 9/0804 430/124.23 |
| 2013/0030110 | A1 | 1/2013 | Okada et al. |
| 2018/0275544 | A1* | 9/2018 | Chonan .............. G03G 9/08795 |
| 2019/0292412 | A1* | 9/2019 | Yamasaki .................. C09J 4/06 |

FOREIGN PATENT DOCUMENTS

| | | | |
|---|---|---|---|
| JP | 2010175933 | | 8/2010 |
| JP | 2012188512 | | 10/2012 |
| JP | 2012189868 | | 10/2012 |
| JP | 2015125431 | | 7/2015 |
| JP | 2016110095 | | 6/2016 |
| JP | 2016128882 | | 7/2016 |
| JP | 2018002889 | | 1/2018 |
| JP | 2018163198 | | 10/2018 |
| JP | 2018163256 | A * | 10/2018 ........... G03G 9/0825 |
| JP | 6468727 | | 2/2019 |
| WO | 2015178251 | | 11/2015 |

* cited by examiner

PRESSURE SENSITIVE ADHESIVE PARTICLES, METHOD FOR PRODUCING PRINTED MATERIAL, AND PRINTED MATERIAL

CROSS-REFERENCE TO RELATED APPLICATIONS

This application is based on and claims priority under 35 USC 119 from Japanese Patent Application No. 2020-040306 filed Mar. 9, 2020.

BACKGROUND

(i) Technical Field

The present disclosure relates to a pressure sensitive adhesive particle, a method for producing a printed material, and a printed material.

(ii) Related Art

Japanese Unexamined Patent Application Publication No. 2012-188512 describes a water-dispersible tackiness agent composition that contains two acryl polymers in an aqueous solvent.

Japanese Unexamined Patent Application Publication No. 2018-002889 describes a bonding material that satisfies the formula: "20° C.≤T(1 MPa)−T(10 MPa)" (where T(1 MPa) represents a temperature at which the viscosity is $10^4$ Pa·s at a pressure of 1 MPa, and T(10 MPa) represents a temperature at which the viscosity is $10^4$ Pa·s at a pressure of 10 MPa).

Japanese Unexamined Patent Application Publication No. 2018-163198 describes a pressure-fixable toner that includes a core and a shell layer that covers the core and contains a resin having a glass transition temperature of 50° C. or more, the core containing a styrene resin and a (meth)acrylate resin having a glass transition temperature at least 30° C. lower than the glass transition temperature of the styrene resin, the core having a sea-island structure constituted by a sea that contains the styrene resin and islands that contain the (meth)acrylate resin and have major axes of 200 nm or more and 500 nm or less.

Japanese Patent No. 6468727 describes a water-dispersible tackiness agent composition that contains an acryl polymer (A), which is a polymer of a monomer raw material (A), and an acryl polymer (B), which is a polymer of a monomer raw material (B), in which the acryl polymer (B) has a glass transition temperature of 0° C. or more and a weight-average molecular weight of more than $0.3 \times 10^4$ but not more than $5 \times 10^4$, the acryl polymer (A) has a weight-average molecular weight of $40 \times 10^4$ or more, the difference between the glass transition temperature of the acryl polymer (B) and the glass transition temperature of the acryl polymer (A) is 70° C. or more, and the monomer raw material (B) contains 3 wt % or more and 20 wt % or less of a carboxyl-group-containing monomer.

Japanese Unexamined Patent Application Publication No. 2007-229993 describes a pressure-bonded postcard sheet that includes a bonding layer that contains an acrylic acid/alkyl methacrylate copolymer.

Japanese Unexamined Patent Application Publication No. 2016-128882 describes an electrostatic latent image-developing toner including a toner particle that includes a toner base particle having a core and a shell layer, and an external additive, in which the shell layer contains a hydrophilic thermosetting resin and a hydrophobic thermoplastic resin, the surface roughness of the toner particle is 10 nm or more and 15 nm or less, and the surface adsorption force of the toner particle is 10 nN or more and 20 nN or less.

Japanese Unexamined Patent Application Publication No. 2010-175933 describes a toner formed of a toner base particle and an external additive, in which the deformation amount at a pressure of 1 mN is 1.0 to 3.0 μm, the deformation amount at a pressure of 5 mN is 3.0 to 5.0 μm, and the surface roughness Ra is within the range of 0.02 to 0.40 μm.

Japanese Unexamined Patent Application Publication No. 2012-189868 describes a toner that has a core-shell structure and contains an external additive, in which the deformation amount H1 when compressed at 0.5 mN in a 25° C. environment is 0.2 μm or more and 1.5 μm or less, the difference D between a deformation amount H2 when compressed at 0.5 mN in a 50° C. environment and the deformation amount H1 is 0.0 μm or more and 1.0 μm or less, and the surface roughness Ra when melted at 90° C. is 0.02 μm or more and 0.40 μm or less.

SUMMARY

Aspects of non-limiting embodiments of the present disclosure relate to a pressure sensitive adhesive particle that includes a pressure sensitive adhesive base particle containing a styrene resin and a (meth)acrylate resin, and an external additive and that has a bulk density that does not easily fluctuate compared to a pressure sensitive adhesive particle having a surface roughness Ra of less than 0.005 μm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a pressure sensitive adhesive particle that includes a pressure sensitive adhesive base particle that contains a styrene resin containing styrene and a vinyl monomer other than styrene as polymerization components, and a (meth)acrylate resin containing at least two (meth)acrylates as polymerization components, in which a mass ratio of the (meth)acrylates relative to a total of polymerization components of the (meth)acrylate resin is 90 mass % or more; and an external additive. The pressure sensitive adhesive particle has a surface having an arithmetic average roughness Ra within a range of 0.005 μm to 0.100 μm. The pressure sensitive adhesive particle has at least two glass transition temperatures, and the difference between the lowest glass transition temperature and the highest glass transition temperature among the glass transition temperatures of the pressure sensitive adhesive particle is 30° C. or more.

BRIEF DESCRIPTION OF THE DRAWINGS

Exemplary embodiments of the present disclosure will be described in detail based on the following figures, wherein.

DETAILED DESCRIPTION

Figure 1:
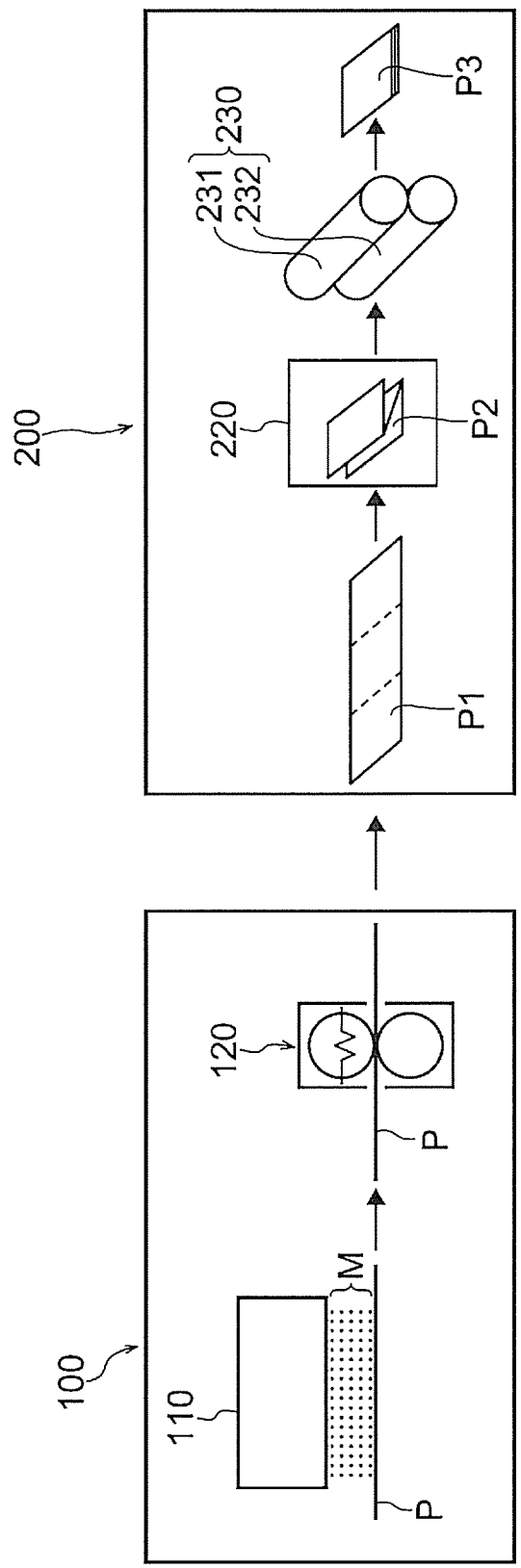
FIG. 1 is a schematic diagram of an example of an apparatus for producing a printed material according to an exemplary embodiment.

Exemplary embodiments of the present disclosure will now be described. The following descriptions and examples are merely exemplary embodiments and do not limit the scopes of the exemplary embodiments.

In the present disclosure, the numerical range that uses "to" indicates an inclusive range in which the values preceding and following the word "to" are included as the minimum value and the maximum value, respectively, of the range.

When numerical ranges are described stepwise in the present disclosure, the upper limit or the lower limit of one numerical range may be substituted with an upper limit or a lower limit of a different numerical range also described stepwise. In the numerical ranges described in the present disclosure, the upper limit or the lower limit of one numerical range may be substituted with a value indicated in Examples.

In the present disclosure, the term "step" not only refers to an independent step but also refers to any instance that achieves the desired purpose of that step although such a step is not clearly distinguishable from other steps.

In the present disclosure, when a drawing is referred to describe an exemplary embodiment, the structure of that exemplary embodiment is not limited to the structure illustrated in the drawing. Moreover, the size of a member in each drawing is schematic, and the relative size relationship between the members is not limited to what is illustrated.

In the present disclosure, each component may contain more than one corresponding substances. In the present disclosure, when the amount of a component in a composition is referred and when there are two or more substances that correspond to that component in the composition, the amount is the total amount of the two or more substances in the composition unless otherwise noted.

In the present disclosure, particles corresponding to each component may contain more than one types of particles. When there are more than one types of particles corresponding to one component in the composition, the particle diameter of each component is a particle diameter of a mixture of the more than one types of particles present in the composition unless otherwise noted.

In the present disclosure, the notation "(meth)acryl" means "acryl" or "methacryl".

In the present disclosure, a printed material formed by folding a recording medium and bonding the opposing surfaces or a printed material formed by placing two or more recording media on top of each other and bonding the opposing surfaces is referred to as a "pressure-bonded printed material".

Pressure Sensitive Adhesive Particle

A pressure sensitive adhesive particle according to an exemplary embodiment contains an external additive and a pressure sensitive adhesive base particle. The pressure sensitive adhesive particle contains a styrene resin containing styrene and a vinyl monomer other than styrene as polymerization components; and a (meth)acrylate resin that contains at least two (meth)acrylates as polymerization components, in which the mass ratio of the (meth)acrylates relative to the total of polymerization components of the (meth)acrylate resin is 90 mass % or more. In addition, the pressure sensitive adhesive particle has a surface roughness Ra of 0.005 µm or more and 0.100 µm or less and has at least two glass transition temperatures, and the difference between the highest glass transition temperature and the lowest glass transition temperature is 30° C. or more.

The pressure sensitive adhesive particle of this exemplary embodiment undergoes pressure-induced phase transition due to the thermal properties that the pressure sensitive adhesive particle "has at least two glass transition temperatures, and the difference between the highest glass transition temperature and the lowest glass transition temperature is 30° C. or more". In the present disclosure, a pressure sensitive adhesive particle that undergoes pressure-induced phase transition refers to a pressure sensitive adhesive particle that satisfies formula 1 below:

$$10° C. \leq T1 - T2 \qquad \text{formula 1}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining the temperature T1 and the temperature T2 is described below.

The pressure sensitive adhesive particle of this exemplary embodiment readily undergoes pressure-induced phase transition and exhibits excellent adhesiveness since the pressure sensitive adhesive particle contains "a styrene resin containing styrene and a vinyl monomer other than styrene as polymerization components" and "a (meth)acrylate resin that contains at least two (meth)acrylates as polymerization components, and the mass ratio of the (meth)acrylates relative to a total of polymerization components of the (meth)acrylate resin is 90 mass % or more". The mechanism behind this is presumably as follows.

In general, a styrene resin and a (meth)acrylate resin have low compatibility to each other, and thus it is considered that these resins in the pressure sensitive adhesive base particle are in a phase separated state. Moreover, it is considered that when a pressure sensitive adhesive base particle is pressurized, the (meth)acrylate resin having a relatively low glass transition temperature is fluidized first, and this fluidization affects the styrene resin, resulting in fluidization of both resins. It is also considered that when the two resins in the pressure sensitive adhesive base particle solidify and form a resin layer as the pressure is decreased after the two resins have fluidized under pressure, a phase separated state is again formed due to their low compatibility.

It is assumed that a (meth)acrylate resin that contains at least two (meth)acrylates as polymerization components is easily fluidizable under pressure because there are at least two types of ester groups bonded to the main chain and thus the degree of molecular alignment in a solid state is low compared to a homopolymer of a (meth)acrylate. Moreover, it is assumed that when the mass ratio of the (meth)acrylates relative to the total of the polymerization components is 90 mass % or more, at least two types of ester groups are present at a high density; thus, the degree of molecular alignment in a solid state becomes lower, and thus the resin becomes easily fluidizable under pressure. Thus, it is assumed that the pressure sensitive adhesive particle of this exemplary embodiment more readily undergoes pressure-induced fluidization, in other words, pressure-induced phase transition, compared to a pressure sensitive adhesive particle in which the (meth)acrylate resin is a homopolymer of a (meth)acrylate.

In addition, it is assumed that a (meth)acrylate resin containing at least two (meth)acrylates as polymerization components, in which the mass ratio of the (meth)acrylates relative to the total of polymerization components is 90 mass % or more, has a low degree of molecular alignment during re-solidification, and, thus, a microphase separation occurs with a styrene resin. The finer the state of phase separation between the styrene resin and the (meth)acrylate resin, the higher the uniformity of the state of the bonding surface to an adherend, and the more excellent the adhesiveness. Thus, it is assumed that the pressure sensitive adhesive particle of this exemplary embodiment has excellent adhesiveness compared to a pressure sensitive adhesive particle in which the (meth)acrylate resin is a homopolymer of a (meth) acrylate.

The bulk density of the pressure sensitive adhesive particle of this exemplary embodiment does not easily fluctuate since the surface roughness Ra is 0.005 µm or more and 0.100 µm or less. It is assumed that when the surface roughness Ra is within the aforementioned range, the external additive that exists on the surface of the pressure sensitive adhesive base particle keeps an appropriate distance between the pressure sensitive adhesive base particles and maintains flowability of the pressure sensitive adhesive particle. Presumably thus, the bulk density of the pressure sensitive adhesive particle does not fluctuate easily.

According to the pressure sensitive adhesive particle of this exemplary embodiment, since the bulk density of the pressure sensitive adhesive particle is maintained, the loading amount of the pressure sensitive adhesive particle relative to the recording medium can be controlled to be within the intended range, and anticipated adhesiveness (peel force) can be achieved.

In addition, the amount of the pressure sensitive adhesive particle inside the apparatus decreases with the progress of production of printed materials. Here, the amount of the consumed pressure sensitive adhesive particle can be accurately detected because the bulk density of the pressure sensitive adhesive particle does not fluctuate easily. Thus, the pressure sensitive adhesive particle in an amount suitable for the amount of the consumed pressure sensitive adhesive particle can be supplied from a cartridge. In this manner also, the loading amount of the pressure sensitive adhesive particle relative to the recording medium can be controlled to be within the intended range, and anticipated adhesiveness (peel force) can be achieved.

From the viewpoint of further suppressing fluctuations of the bulk density, the surface roughness Ra of the pressure sensitive adhesive particle of this exemplary embodiment is more preferably 0.015 µm or more and 0.050 m or less, yet more preferably 0.020 µm or more and 0.045 µm or less, and still more preferably 0.030 µm or more and 0.040 µm or less.

In this exemplary embodiment, the surface roughness Ra of the pressure sensitive adhesive particle is determined by the following method.

A scanning electron microscope equipped with four secondary electron detectors (for example, electron beam three-dimensional roughness analyzer ERA-8900FE produced by ELIONIX INC.) is used as an apparatus for three-dimensionally analyzing the surface profile of the pressure sensitive adhesive particle, and the analysis is performed as follows.

A surface of one pressure sensitive adhesive particle is enlarged at a magnification of 30,000×. Measurement points are set at 400 points in the long side direction and 300 points in the short side direction at intervals of 0.0100 µm, and an image having a measurement area of 4 µm×3 µm is captured. Then an image in a 2 µm×2 µm central region is extracted to obtain three-dimensional image data.

Wavelengths having cycles of 2 µm or more are removed from the obtained three-dimensional image data by setting the limit wavelength of a spline filter (a frequency selective filter that uses the spline function) to 2 µm, and, as a result, relatively large waviness components on the pressure sensitive adhesive particle surface are removed, and three-dimensional roughness curve data is obtained.

A region 2 µm in the X direction×2 µm in the Y direction is extracted from a center portion of the three-dimensional roughness curve data, and two hundred sections parallel to the X direction are prepared at a pitch of 0.0100 µm in the Y direction. The length, 2 µm, in the X direction is the length of a section, and constitutes a reference length. Next, from each of the sections, the arithmetic average height Ra of the profile as defined in JIS B 0601:2013 is determined, and the arithmetic average heights Ra of two hundred sections are arithmetically averaged.

Furthermore, for twenty pressure sensitive adhesive particles, the aforementioned Ra is determined, and the arithmetically averaged value is assumed to be the surface roughness Ra.

The surface roughness Ra in this exemplary embodiment can be adjusted by the type, the particle diameter, and externally added amount of the external additive; the order in which multiple external additives are externally added; the stirring speed during external addition of the external additive; or any combination thereof.

The components, structure, and properties of the pressure sensitive adhesive particle according to this exemplary embodiment will now be described in detail. In the description below, unless otherwise noted, a "styrene resin" refers to a "styrene resin that contains styrene and a vinyl monomer other than styrene as polymerization components", and a "(meth)acrylate resin" refers to a "(meth)acrylate resin that contains at least two (meth)acrylates as polymerization components, in which the mass ratio of the (meth)acrylates relative to the total of polymerization components is 90 mass % or more".

The pressure sensitive adhesive particle of the exemplary embodiment contains at least a pressure sensitive adhesive base particle and an external additive.

Pressure Sensitive Adhesive Base Particle

The pressure sensitive adhesive base particle contains at least a styrene resin and a (meth)acrylate resin. The pressure sensitive adhesive base particle may further contain a coloring agent, a releasing agent, and other additives.

From the viewpoint of maintaining adhesiveness, the pressure sensitive adhesive base particle may contain a larger amount of the styrene resin than the (meth)acrylate resin. The styrene resin content relative to the total content of the styrene resin and the (meth)acrylate resin is preferably 55 mass % or more and 80 mass % or less, is more preferably 60 mass % or more and 75 mass % or less, and is yet more preferably 65 mass % or more and 70 mass % or less.

Styrene Resin

The pressure sensitive adhesive base particle that constitutes the pressure sensitive adhesive particle of this exemplary embodiment contains a styrene resin that contains styrene and a vinyl monomer other than styrene as polymerization components.

From the viewpoint of suppressing fluidization of the pressure sensitive adhesive particle in an unpressured state, the mass ratio of styrene relative to the total of the polymerization components of the styrene resin is preferably 60 mass % or more, more preferably 70 mass % or more, and yet more preferably 75 mass % or more. From the viewpoint of forming a pressure sensitive adhesive particle that easily undergoes pressure-induced phase transition, the mass ratio is preferably 95 mass % or less, more preferably 90 mass % or less, and yet more preferably 85 mass % or less.

Examples of the vinyl monomer other than styrene constituting the styrene resin include styrene monomers other than styrene and acryl monomers.

Examples of the styrene monomers other than styrene include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene. These styrene monomers may be used alone or in combination.

The acryl monomer may be at least one acryl monomer selected from the group consisting of (meth)acrylic acid and (meth)acrylates. Examples of the (meth)acrylates include (meth)acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylates. These acryl monomers may be used alone or in combination.

Examples of the (meth)acrylic acid alkyl esters include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

Examples of other vinyl monomer constituting the styrene resin include, in addition to the styrene monomers and acryl monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming a pressure sensitive adhesive particle that easily undergoes pressure-induced phase transition, the styrene resin preferably contains, as a polymerization component, a (meth)acrylate, more preferably a (meth)acrylic acid alkyl ester, yet more preferably a (meth)acrylic acid alkyl ester in which the alkyl group contains 2 to 10 carbon atoms, still more preferably a (meth)acrylic acid alkyl ester in which the alkyl group contains 4 to 8 carbon atoms, and particularly preferably at least one of n-butyl acrylate and 2-ethylhexyl acrylate. From the viewpoint of forming a pressure sensitive adhesive particle that easily undergoes pressure-induced phase transition, the styrene resin and the (meth)acrylate resin may contain the same (meth)acrylate as a polymerization component.

From the viewpoint of suppressing fluidization of the pressure sensitive adhesive particle in an unpressured state, the mass ratio of the (meth)acrylate relative to the total of the polymerization components of the styrene resin is preferably 40 mass % or less, more preferably 30 mass % or less, and yet more preferably 25 mass % or less. From the viewpoint of forming a pressure sensitive adhesive particle that easily undergoes pressure-induced phase transition, the mass ratio is preferably 5 mass % or more, more preferably 10 mass % or more, and yet more preferably 15 mass % or more. The (meth)acrylate here is preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

The styrene resin particularly preferably contains, as a polymerization component, at least one of n-butyl acrylate and 2-ethylhexyl acrylate, and the total amount of n-butyl acrylate and 2-ethylhexyl acrylate relative to the total of polymerization components of the styrene resin is preferably 40 mass % or less, more preferably 30 mass % or less, and yet more preferably 25 mass % or less from the viewpoint of suppressing fluidization of the pressure sensitive adhesive particle in an unpressured state. From the viewpoint of forming a pressure sensitive adhesive particle that easily undergoes pressure-induced phase transition, the total amount is preferably 5 mass % or more, more preferably 10 mass % or more, and yet more preferably 15 mass % or more.

From the viewpoint of suppressing fluidization of the pressure sensitive adhesive particle in an unpressured state, the weight-average molecular weight of the styrene resin is preferably 3000 or more, more preferably 4000 or more, and yet more preferably 5000 or more. From the viewpoint of forming a pressure sensitive adhesive particle that easily undergoes pressure-induced phase transition, the weight-average molecular weight is preferably 60000 or less, more preferably 55000 or less, and yet more preferably 50000 or less.

In the present disclosure, the weight-average molecular weight of a resin is measured by gel permeation chromatography (GPC). The molecular weight measurement by GPC is conducted by using HLC-8120GPC produced by TOSOH CORPORATION as a GPC instrument with columns, TSKgel Super HM-M (15 cm) produced by TOSOH CORPORATION, and tetrahydrofuran as a solvent. The weight-average molecular weight of a resin is calculated by using a molecular weight calibration curve prepared by using monodisperse polystyrene standard samples.

From the viewpoint of suppressing fluidization of the pressure sensitive adhesive particle in an unpressured state, the glass transition temperature of the styrene resin is preferably 30° C. or more, more preferably 40° C. or more, and yet more preferably 50° C. or more. From the viewpoint of forming a pressure sensitive adhesive particle that easily undergoes pressure-induced phase transition, the glass transition temperature is preferably 110° C. or less, more preferably 100° C. or less, and yet more preferably 90° C. or less.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin can be controlled by the types of polymerization components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the pressure sensitive adhesive particle in an unpressured state, the mass ratio of the styrene resin relative to the entire pressure sensitive adhesive base particle in this exemplary embodiment is preferably 55 mass % or more, more preferably 60 mass % or more, and yet more preferably 65 mass % or more. From the viewpoint of forming a pressure sensitive adhesive particle that easily undergoes pressure-induced phase transition, the mass ratio is preferably 80 mass % or less, more preferably 75 mass % or less, and yet more preferably 70 mass % or less.

(Meth)Acrylate Resin

The pressure sensitive adhesive base particle constituting the pressure sensitive adhesive particle of this exemplary embodiment contains a (meth)acrylate resin that contains at least two (meth)acrylates as polymerization components, and the mass ratio of the (meth)acrylates relative to the total of polymerization components is 90 mass % or more.

The mass ratio of the (meth)acrylates relative to the total of the polymerization components of the (meth)acrylate resin is 90 mass % or more, preferably 95 mass % or more, more preferably 98 mass % or more, and yet more preferably 100 mass %.

Examples of the (meth)acrylates include (meth)acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylates.

Examples of the (meth)acrylic acid alkyl esters include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

These (meth)acrylates may be used alone or in combination.

From the viewpoint of forming a pressure sensitive adhesive particle that easily undergoes pressure-induced phase transition and has excellent adhesiveness, the (meth)acrylates are preferably (meth)acrylic acid alkyl esters, yet more preferably (meth)acrylic acid alkyl esters in which the alkyl group contains 2 to 10 carbon atoms, still more preferably (meth)acrylic acid alkyl esters in which the alkyl group contains 4 to 8 carbon atoms, and particularly preferably n-butyl acrylate and 2-ethylhexyl acrylate. From the viewpoint of forming a pressure sensitive adhesive particle that easily undergoes pressure-induced phase transition, the styrene resin and the (meth)acrylate resin may contain the same (meth)acrylate as a polymerization component.

From the viewpoint of forming a pressure sensitive adhesive particle that easily undergoes pressure-induced phase transition and has excellent adhesiveness, the mass ratio of the (meth)acrylic acid alkyl esters relative to the total of the polymerization components of the (meth)acrylate resin is preferably 90 mass % or more, more preferably 95 mass % or more, yet more preferably 98 mass % or more, and still more preferably 100 mass %. The (meth)acrylic acid alkyl esters here preferably each have an alkyl group having 2 to 10 carbon atoms and more preferably each have an alkyl group containing 4 to 8 carbon atoms.

From the viewpoint of forming a pressure sensitive adhesive particle that easily undergoes pressure-induced phase transition and has excellent adhesiveness, the mass ratio between two (meth)acrylates having the largest and second-largest mass ratios among the at least two (meth)acrylates contained as the polymerization components in the (meth)acrylate resin is preferably 80:20 to 20:80, more preferably 70:30 to 30:70, and yet more preferably 60:40 to 40:60.

The two (meth)acrylates having the largest and second-largest mass ratios among the at least two (meth)acrylates contained as the polymerization components in the (meth)acrylate resin are preferably (meth)acrylic acid alkyl esters. The (meth)acrylic acid alkyl esters here preferably each have an alkyl group having 2 to 10 carbon atoms and more preferably each have an alkyl group containing 4 to 8 carbon atoms.

When the two (meth)acrylates having the largest and second-largest mass ratios among the at least two (meth)acrylates contained as polymerization components in the (meth)acrylate resin are (meth)acrylic acid alkyl esters, from the viewpoint of forming a pressure sensitive adhesive particle that easily undergoes pressure-induced phase transition and has excellent adhesiveness, the difference in the number of carbon atoms in the alkyl group between the two (meth)acrylic acid alkyl esters is preferably 1 to 4, more preferably 2 to 4, and yet more preferably 3 or 4.

From the viewpoint of forming a pressure sensitive adhesive particle that easily undergoes pressure-induced phase transition and has excellent adhesiveness, the (meth)acrylate resin preferably contains, as polymerization components, n-butyl acrylate and 2-ethylhexyl acrylate. In particular, the two (meth)acrylates having the largest and second-largest mass ratios among the at least two (meth)acrylates contained as polymerization components in the (meth)acrylate resin are preferably n-butyl acrylate and 2-ethylhexyl acrylate. The total amount of n-butyl acrylate and 2-ethylhexyl acrylate relative to the total of polymerization components of the (meth)acrylate resin is preferably 90 mass % or more, more preferably 95 mass % or more, yet more preferably 98 mass % or more, and still more preferably 100 mass %.

The (meth)acrylate resin may further contain, as polymerization components, vinyl monomers other than (meth) acrylates. Examples of the vinyl monomers other than the (meth)acrylates include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. These vinyl monomers may be used alone or in combination.

When the (meth)acrylate resin contains a vinyl monomer other than (meth)acrylates as polymerization components, the vinyl monomer other than the (meth)acrylates is preferably at least one of acrylic acid and methacrylic acid and is more preferably acrylic acid.

From the viewpoint of suppressing fluidization of the pressure sensitive adhesive particle in an unpressured state, the weight-average molecular weight of the (meth)acrylate resin is preferably 50,000 or more, more preferably 100,000 or more, and yet more preferably 120,000 or more. From the viewpoint of forming a pressure sensitive adhesive particle that easily undergoes pressure-induced phase transition, the weight-average molecular weight is preferably 250,000 or less, more preferably 220,000 or less, and yet more preferably 200,000 or less.

From the viewpoint of forming a pressure sensitive adhesive particle that easily undergoes pressure-induced phase transition, the glass transition temperature of the (meth) acrylate resin is preferably 10° C. or less, more preferably 0° C. or less, and yet more preferably −10° C. or less. From the viewpoint of suppressing fluidization of the pressure sensitive adhesive particle in an unpressured state, the glass transition temperature is preferably −90° C. or more, more preferably −80° C. or more, and yet more preferably −70° C. or more.

In this exemplary embodiment, from the viewpoint of forming a pressure sensitive adhesive particle that easily undergoes pressure-induced phase transition, the mass ratio of the (meth)acrylate resin relative to the entire pressure sensitive adhesive base particle is preferably 20 mass % or more, more preferably 25 mass % or more, and yet more preferably 30 mass % or more. From the viewpoint of suppressing fluidization of the pressure sensitive adhesive particle in an unpressured state, the mass ratio is preferably 45 mass % or less, more preferably 40 mass % or less, and yet more preferably 35 mass % or less.

In this exemplary embodiment, the total amount of the styrene resin and the (meth)acrylate resin contained in the pressure sensitive adhesive base particle relative to the entire pressure sensitive adhesive base particle is preferably 70 mass % or more, more preferably 80 mass % or more, yet more preferably 90 mass % or more, still preferably 95 mass % or more, and most preferably 100 mass %.

Other Resins

The pressure sensitive adhesive base particle may contain, for example, polystyrene, and a non-vinyl resin such as an epoxy resin, a polyester resin, a polyurethane resin, a polyamide resin, a cellulose resin, a polyether resin, or modified rosin. These resins may be used alone or in combination.

Various Additives

The pressure sensitive adhesive base particle may contain, if needed, a coloring agent (for example, a pigment or a dye), a releasing agent (for example, hydrocarbon wax, natural wax such as carnauba wax, rice wax, or candelilla wax, a synthetic or mineral or petroleum wax such as montan wax; or ester wax such as fatty acid ester or montanic acid ester), a charge controlling agent, and the like.

When the pressure sensitive adhesive particle of this exemplary embodiment is transparent, the amount of the coloring agent in the pressure sensitive adhesive base particle relative to the entire pressure sensitive adhesive base particle may be 1.0 mass % or less, and, from the viewpoint of increasing the transparency of the pressure sensitive adhesive particle, is preferably as small as possible.

Structure of Pressure Sensitive Adhesive Base Particle

The inner structure of the pressure sensitive adhesive base particle may be a sea-island structure. The sea-island structure may be constituted by a sea phase containing a styrene resin and island-phases containing a (meth)acrylate resin and being dispersed in the sea phase. Specific examples of the styrene resin contained in the sea phase are as described above. Specific examples of the (meth)acrylate resin contained in the island phases are as described above. Alternatively, island phases not containing a (meth)acrylate resin may be dispersed in the sea phase.

When the pressure sensitive adhesive base particle has a sea-island structure, the average size of the island phases may be 200 nm or more and 500 nm or less. When the average size of the island phases is 500 nm or less, the pressure sensitive adhesive base particle easily undergoes pressure-induced phase transition. When the average size of the island phases is 200 nm or more, excellent mechanical strength desired for the pressure sensitive adhesive base particle (for example, the strength that withstands deformation during stirring in a developing device) is exhibited. From these viewpoints, the average size of the island phases is more preferably 220 nm or more and 450 nm or less and yet more preferably 250 nm or more and 400 nm or less.

Examples of the method for controlling the average size of the island phases of the sea-island structure to be within the aforementioned range include increasing or decreasing the amount of the (meth)acrylate resin relative to the amount of the styrene resin and increasing or decreasing the length of time of maintaining a high temperature in the step of fusing and coalescing aggregated particles in the method for producing pressure sensitive adhesive base particle described below.

The sea-island structure is confirmed and the average size of the island phases is measured as follows.

The pressure sensitive adhesive particle is embedded in an epoxy resin, a section is prepared by using a diamond knife or the like, and the prepared section is stained with osmium tetroxide or ruthenium tetroxide in a desiccator. The stained section is observed with a scanning electron microscope (SEM). The sea phase and the island phases of the sea-island structure are distinguished by the shade created by the degree of staining with osmium tetroxide or ruthenium tetroxide, and the presence or absence of the sea-island structure is identified by the shade. From an SEM image, one hundred island phases are selected at random, a long axis of each island phase is measured, and the average of one hundred long axes is used as the average size.

The pressure sensitive adhesive base particle may have a single layer structure or may have a core-shell structure including a core and a shell layer that covers the core. From the viewpoint of suppressing fluidization of the pressure sensitive adhesive particle in an unpressured state, the pressure sensitive adhesive base particle may have a core-shell structure.

From the viewpoint of facilitating the pressure-induced phase transition, when the pressure sensitive adhesive base particle has a core-shell structure, the core may contain a styrene resin and a (meth)acrylate resin. From the viewpoint of suppressing fluidization of the pressure sensitive adhesive particle in an unpressured state, the shell layer may contain a styrene resin. The specific examples of the styrene resin are as described above. The specific examples of the (meth) acrylate resin are as described above.

When the pressure sensitive adhesive base particle has a core-shell structure, the core may have a sea phase containing a styrene resin and island phases containing a (meth) acrylate resin and being dispersed in the sea phase. The average size of the island phases may be within the aforementioned range. In addition to the core having the above-described structure, the shell layer may contain a styrene resin. In such a case, the sea phase of the core and the shell layer form a continuous structure, and the pressure sensitive adhesive base particle easily undergoes pressure-induced phase transition. The specific examples of the styrene resin contained in the sea phase of the core and the shell layer are as described above. The specific examples of the (meth) acrylate resin contained in the island phases of the core are as described above.

Examples of the resin contained in the shell layer also include polystyrene, and non-vinyl resins such as epoxy resins, polyester resins, polyurethane resins, polyamide resins, cellulose resins polyether resins, and modified rosin. These resins may be used alone or in combination.

From the viewpoint of suppressing deformation of the pressure sensitive adhesive base particle, the average thickness of the shell layer is preferably 120 nm or more, more preferably 130 nm or more, and yet more preferably 140 nm or more. From the viewpoint of facilitating the pressure-induced phase transition of the pressure sensitive adhesive base particle, the average thickness is preferably 550 nm or less, more preferably 500 nm or less, and yet more preferably 400 nm or less.

The average thickness of the shell layer is measured by the following method.

The pressure sensitive adhesive particle is embedded in an epoxy resin, a section is prepared by using a diamond knife or the like, and the prepared section is stained with osmium tetroxide or ruthenium tetroxide in a desiccator. The stained section is observed with a scanning electron microscope (SEM). From an SEM image, sections of ten pressure sensitive adhesive base particles are selected at random, the thickness of the shell layer is measured at twenty positions for each of the pressure sensitive adhesive base particles, and the average thickness is calculated. The average value of ten pressure sensitive adhesive base particles is used as the average thickness.

From the viewpoint of handling ease of the pressure sensitive adhesive base particle, the volume-average particle diameter (D50v) of the pressure sensitive adhesive base particle is preferably 4 μm or more, more preferably 5 μm or more, and yet more preferably 6 μm or more, and from the viewpoint of facilitating the pressure-induced phase transition of the entire pressure sensitive adhesive base particle, the volume-average particle diameter (D50v) is preferably 12 μm or less, more preferably 10 μm or less, and yet more preferably 9 μm or less.

The volume-average particle diameter (D50v) of the pressure sensitive adhesive base particle is determined by using COULTER MULTISIZER II (produced by Beckman Coulter Inc.) with apertures having an aperture diameter of 100 μm. Into 2 mL of a 5 masso aqueous sodium alkyl benzenesulfonate solution, 0.5 mg or more and 50 mg or less of the pressure sensitive adhesive base particle is added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50% accumulation in a volume-based particle size distribution calculated from the small diameter side is used as the volume-average particle diameter (D50v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These may be used alone or in combination. The amount of the hydrophobizing agent is, for example, 1 part by mass or more and 10 parts by mass or less relative to 100 parts by mass of the inorganic particles.

Other examples of the external additive include resin particles (resin particles of polystyrene, polymethyl methacrylate, melamine resin, etc.), and cleaning activating agents (for example, particles of metal salts of higher aliphatic acids such as zinc stearate and fluorine high-molecular-weight materials).

From the viewpoint of controlling the surface roughness Ra, silica particles and titanium oxide particles are preferably used in combination as the external additive, and more preferably, spherical silica particles and flat titanium oxide particles are used in combination as the external additive.

When silica particles and titanium oxide particles are externally added to the pressure sensitive adhesive base particle, titanium oxide particles having a larger specific gravity attach to the pressure sensitive adhesive base particle first, and the titanium oxide particles (preferably flat titanium oxide particles) appropriately cover the surface of the pressure sensitive adhesive base particle. In this manner, the silica particles are prevented from becoming buried, and are appropriately dispersed. As a result, the titanium oxide particles and the silica particles form a surface roughness Ra on the surface of the pressure sensitive adhesive base particle.

When silica particles and titanium oxide particles are used in combination, the mass-based externally added amount ratio (externally added amount of silica particles/externally added amount of titanium oxide particles) is preferably 3.0 or more and 7.0 or less, more preferably 3.5 or more and 6.0 or less, and yet more preferably 4.0 or more and 5.0 or less.

The number-average particle diameter of the titanium oxide particles is preferably 10 nm or more and 50 nm or less, more preferably 15 nm or more and 45 nm or less, and yet more preferably 20 nm or more and 40 nm or less.

For the silica particles, silica particles having a particle diameter of 80 nm or more (referred to as "large-diameter silica particles") and silica particles having a particle diameter of less than 80 nm (referred to as "small-diameter silica particles") are preferably used in combination.

The number-average particle diameter of the large-diameter silica particles is preferably 100 nm or more and 160 nm or less and more preferably 110 nm or more and 140 nm or less.

The number-average particle diameter of the small-diameter silica particles is preferably 30 nm or more and 70 nm or less and more preferably 40 nm or more and 60 nm or less.

The number-average particle diameters of the silica particles and titanium oxide particles are determined as follows.

(1) Pressure sensitive adhesive particles are dispersed in methanol, stirred at room temperature (23° C.), and treated in an ultrasonic wave bath to remove the external additive from the pressure sensitive adhesive particles. Then the pressure sensitive adhesive base particles are settled by centrifugal separation, and the dispersion containing the dispersed extremal additive is recovered. Subsequently, methanol is distilled away and the external additive is obtained.

(2) The external additive is dispersed in polyester resin particles having a volume-average particle diameter of 100 μm.

(3) The polyester resin particles with the external additive dispersed therein are observed with a scanning electron microscope (SEM) (S-4800 produced by Hitachi High-Tech Science Corporation) equipped with an energy-dispersive X-ray analyzer (EDX apparatus) (EMAX Evolution produced by Horiba Ltd.), and an image is taken at a magnification of 40,000×. During this process, 300 or more primary particles of silica are identified by EDX analysis on the basis of the presence of Si from one area of view. Alternatively, 300 or more primary particles of titanium oxide are identified on the basis of the presence of Ti from one area of view. SEM observation is conducted at an accelerating voltage of 15 kV, an emission current of 20 μA, and WD of 15 mm. EDX analysis is conducted under the same conditions for a detection time of 60 minutes.

(4) The obtained image is captured into an image analyzer (LUZEX III produced by NIRECO) and the area of each particle is determined by image analysis.

(5) The particle diameter of the silica particle (or the titanium oxide particle) is determined as an equivalent circle diameter from the measured area value.

(6) For the silica particles (or titanium oxide particles), the equivalent circle diameter cumulative distribution is plotted from the small diameter side, and the particle diameter at the 50% accumulation is assumed to be the number-average particle diameter of the silica particles (titanium oxide particles). For the silica particles, those silica particles which have an equivalent circle diameter of 80 nm or more are selected, the equivalent circle diameter cumulative distribution is plotted from the small diameter side, and the particle diameter at the 50% accumulation is assumed to be the number-average particle diameter of the large-diameter silica particles. For the silica particles, those silica particles which have an equivalent circle diameter of less than 80 nm are selected, the equivalent circle diameter cumulative distribution is plotted from the small diameter side, and the particle diameter at the 50% accumulation is assumed to be the number-average particle diameter of the small-diameter silica particles.

The total externally added amount of the silica particles relative to 100 parts by mass of the pressure sensitive adhesive base particles is preferably 0.01 mass % or more and 20 mass % or less and is more preferably 0.1 mass % or more and 10 mass % or less.

The total externally added amount of the titanium oxide particles relative to 100 parts by mass of the pressure sensitive adhesive base particles is preferably 0.01 mass % or more and 20 mass % or less and is more preferably 0.1 mass % or more and 10 mass % or less.

The total externally added amount of the external additive relative to 100 parts by mass of the pressure sensitive adhesive base particles is preferably 1.0 mass % or more and 20.0 mass % or less, more preferably 1.0 part by mass or more and 10.0 parts by mass or less, and yet more preferably 2.5 mass % or more and 7.0 mass % or less.

Properties of Pressure Sensitive Adhesive Particle

The pressure sensitive adhesive particle of the exemplary embodiment has at least two glass transition temperatures, one of which is presumed to be that of the styrene resin and the other one of which is presumed to be that of the (meth)acrylate resin.

The pressure sensitive adhesive particle of the present exemplary embodiment may have three or more glass transition temperatures; however, the number of glass transition temperatures is preferably two. Examples of the case in which there are two glass transition temperatures include the case in which a styrene resin and a (meth)acrylate resin are the only resins contained in the pressure sensitive adhesive particle, and the case in which the amount of resins other than the styrene resin and the (meth)acrylate resin is small (for example, the amount of other resins is 5 mass % or less relative to the entire pressure sensitive adhesive particle).

The pressure sensitive adhesive particles of this exemplary embodiment have at least two glass transition temperatures, and the difference between the lowest glass transition temperature and the highest glass transition temperature is 30° C. or more. From the viewpoint of facilitating the pressure-induced phase transition of the pressure sensitive adhesive particle, the difference between the lowest glass transition temperature and the highest glass transition temperature is preferably 40° C. or more, yet more preferably 50° C. or more, and still more preferably 60° C. or more. The upper limit of the difference between the highest glass transition temperature and the lowest glass transition temperature is, for example, 140° C. or less, and may be 130° C. or less or 120° C. or less.

From the viewpoint of facilitating the pressure-induced phase transition of the pressure sensitive adhesive particle, the lowest glass transition temperature of the pressure sensitive adhesive particle of this exemplary embodiment is preferably 10° C. or less, more preferably 0° C. or less, and yet more preferably −10° C. or less. From the viewpoint of suppressing fluidization of the pressure sensitive adhesive particle in an unpressured state, the lowest glass transition temperature is preferably −90° C. or more, more preferably −80° C. or more, and yet more preferably −70° C. or more.

From the viewpoint of suppressing fluidization of the pressure sensitive adhesive particle in an unpressured state, the highest glass transition temperature of the pressure sensitive adhesive particle of this exemplary embodiment is preferably 30° C. or more, more preferably 40° C. or more, and yet more preferably 50° C. or more. From the viewpoint of facilitating the pressure-induced phase transition of the pressure sensitive adhesive particle, the highest glass transition temperature is preferably 70° C. or less, more preferably 65° C. or less, and yet more preferably 60° C. or less.

In the present disclosure, the glass transition temperature of the pressure sensitive adhesive particle is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The pressure sensitive adhesive particle of the exemplary embodiment undergoes pressure-induced phase transition, and satisfies formula 1 below:

$$10° C. \leq T1-T2 \quad \text{formula 1}$$

In formula 1, T1 represents a temperature at which the viscosity is 10000 Pa·s at a pressure of 1 MPa, and T2 represents a temperature at which the viscosity is 10000 Pa·s at a pressure of 10 MPa.

From the viewpoint of facilitating the pressure-induced phase transition of the pressure sensitive adhesive particle, the temperature difference (T1−T2) is preferably 10° C. or more, more preferably 15° C. or more, and yet more preferably 20° C. or more. From the viewpoint of suppressing fluidization of the pressure sensitive adhesive particle in an unpressured state, the temperature difference (T1−T2) is preferably 120° C. or less, more preferably 100° C. or less, and yet more preferably 80° C. or less.

The value of the temperature T1 is preferably 140° C. or less, more preferably 130° C. or less, yet more preferably 120° C. or less, and still more preferably 115° C. or less. The lower limit of the temperature T1 is preferably 80° C. or more and more preferably 85° C. or more.

The value of the temperature T2 is preferably 40° C. or more, more preferably 50° C. or more, and yet more preferably 60° C. or more. The upper limit of the temperature T2 may be 85° C. or less.

One indicator of how easily the pressure sensitive adhesive particle undergoes pressure-induced phase transition is the temperature difference (T1−T3) between the temperature T1 at which the viscosity is 10000 Pa·s at a pressure of 1 MPa and the temperature T3 at which the viscosity is 10000 Pa·s at a pressure of 4 MPa. The temperature difference (T1−T3) may be 5° C. or more. From the viewpoint of facilitating the pressure-induced phase transition, the temperature difference (T1−T3) of the pressure sensitive adhesive particle is preferably 5° C. or more and more preferably 10° C. or more.

The temperature difference (T1−T3) is typically 25° C. or less.

From the viewpoint of adjusting the temperature difference (T1−T3) to 5° C. or more, the temperature T3 of the pressure sensitive adhesive particle of the exemplary embodiment at which the viscosity is 10000 Pa·s at a pressure of 4 MPa is preferably 90° C. or less, more preferably 85° C. or less, and yet more preferably 80° C. or less. The lower limit of the temperature T3 may be 60° C. or more.

The method for determining the temperature T1, the temperature T2, and the temperature T3 is as follows.

Pressure sensitive adhesive particles are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined as with the method for determining the temperature T1 except that the applied pressure is changed from 1 MPa to 10 MPa. The temperature T3 is determined as with the method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Method for Producing Pressure Sensitive Adhesive Particle

The pressure sensitive adhesive particle of the exemplary embodiment is obtained by first producing a pressure sensitive adhesive base particle and then externally adding an external additive to the pressure sensitive adhesive base particle.

The pressure sensitive adhesive base particle may be produced by a dry method (for example, a kneading and pulverizing method) or a wet method (for example, an aggregation and coalescence method, a suspension polymerization method, or a dissolution suspension method). There is no limitation on these methods, and any known method may be employed. Among these methods, the aggregation and coalescence method may be employed to produce the pressure sensitive adhesive base particle.

When the pressure sensitive adhesive base particle is to be produced by the aggregation and coalescence method, the pressure sensitive adhesive base particle is produced through, for example, the following steps:

a step of preparing a styrene resin particle dispersion in which styrene resin particles containing a styrene resin are dispersed (styrene resin particle dispersion preparation step);

a step of polymerizing a (meth)acrylate resin in the styrene resin particle dispersion so as to form composite resin particles containing the styrene resin and the (meth)acrylate resin (composite resin particle forming step);

a step aggregating the composite resin particles in the composite resin particle dispersion in which the composite resin particles are dispersed so as to form aggregated particles (aggregated particle forming step); and a step of heating the aggregated particle dispersion in which the aggregated particles are dispersed so as to fuse and coalesce the aggregated particles and thereby form pressure sensitive adhesive base particles (fusing and coalescing step).

These steps will now be described in detail.

In the description below, a method for obtaining a pressure sensitive adhesive base particle not containing a coloring agent or a releasing agent is described. A coloring agent, a releasing agent, and other additives may be used as needed. When the pressure sensitive adhesive base particle is to contain a coloring agent and a releasing agent, the fusing and coalescing step is performed after the composite resin particle dispersion, a coloring agent particle dispersion, and a releasing agent particle dispersion are mixed. The coloring agent particle dispersion and the releasing agent particle dispersion can be, for example, prepared by mixing raw materials and then dispersing the particles in a known disperser machine.

Styrene Resin Particle Dispersion Preparation Step

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a styrene resin, and a chain transfer agent or a polymerization initiator are mixed, an aqueous medium containing a surfactant is added to the resulting mixture, the resulting mixture is stirred to prepare an emulsion, and the styrene resin is polymerized in the emulsion. Here, the chain transfer agent may be dodecanethiol.

The volume-average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume-average particle diameter (D50v) of the resin particles contained in the resin particle dispersion is determined by measuring the particle diameter with a laser diffraction scattering particle size distribution meter (for example, LA-700 produced by Horiba Ltd.) and determining the particle diameter at 50% accumulation in a volume-basis particle size distribution calculated from the small diameter side.

The styrene resin particle content in the styrene resin particle dispersion is preferably 30 mass % or more and 60 mass % or less and is more preferably 40 mass % or more and 50 mass % or less.

Composite Resin Particle Forming Step

The styrene resin particle dispersion and the polymerization components of a (meth)acrylate resin are mixed, and the (meth)acrylate resin is polymerized in the styrene resin particle dispersion so as to form composite resin particles containing the styrene resin and the (meth)acrylate resin.

The composite resin particles may be resin particles containing a styrene resin and a (meth)acrylate resin that are in a microphase-separated state. Such resin particles can be produced by, for example, the following method.

To a styrene resin particle dispersion, polymerization components (a group of monomers including at least two (meth)acrylates) of the (meth)acrylate resin are added, and, if needed, an aqueous medium is added thereto. Next, while slowly stirring the dispersion, the temperature of the dispersion is elevated to a temperature higher than or equal to the glass transition temperature of the styrene resin (for example, a temperature 10° C. to 30° C. higher than the glass transition temperature of the styrene resin). Next, while maintaining the temperature, an aqueous medium containing a polymerization initiator is slowly added dropwise, and then stirring is continued for a long time within the range of 1 to 15 hours. Here, the polymerization initiator may be ammonium persulfate.

The detailed mechanism is not clear; however, it is presumed that when the aforementioned method is employed, the monomers and the polymerization initiator penetrate into the styrene resin particles, and the (meth) acrylates become polymerized inside the styrene resin particles. It is presumed that because of this mechanism, composite resin particles in which the (meth)acrylate resin is contained inside the styrene resin particles and in which the styrene resin and the (meth)acrylate resin are in a microphase-separated state inside the particles are obtained.

The volume-average particle diameter of the composite resin particles dispersed in the composite resin particle dispersion is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass % or more and 50 mass % or less and is more preferably 30 mass % or more and 40 mass % or less.

Aggregated Particle Forming Step

The composite resin particles are aggregated in the composite resin particle dispersion so as to form aggregated particles having diameters close to the target diameter of the pressure sensitive adhesive base particle.

Specifically, for example, an aggregating agent is added to the composite resin particle dispersion while the pH of the composite resin particle dispersion is adjusted to acidic (for example, a pH of 2 or more and 5 or less), and after a dispersion stabilizer is added as needed, the dispersion is heated to a temperature close to the glass transition temperature of the styrene resin (specifically, for example, a temperature 10° C. to 30° C. lower than the glass transition temperature of the styrene resin) so as to aggregate the composite resin particles and form aggregated particles.

In the aggregated particle forming step, while the composite resin particle dispersion is being stirred in a rotational shear-type homogenizer, an aggregating agent may be added thereto at room temperature (for example, 25° C.) and the pH of the composite resin particle dispersion may be adjusted to acidic (for example, a pH of 2 or more and 5 or less), and then heating may be performed after the dispersion stabilizer is added as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescing Step

Next, the aggregated particle dispersion containing dispersed aggregated particles is heated to, for example, a temperature equal to or higher than the glass transition temperature of the styrene resin (for example, a temperature 10° C. to 30° C. higher than the glass transition temperature of the styrene resin) to fuse and coalesce the aggregated particles and form a pressure sensitive adhesive base particle.

The pressure sensitive adhesive base particle obtained through the above-described steps usually has a sea-island structure that has a sea phase containing a styrene resin and island phases containing the (meth)acrylate resin and being dispersed in the sea phase. It is presumed that although the styrene resin and the (meth)acrylate resin are in a microphase-separated state in the composite resin particles, the styrene resin has gathered in the fusing and coalescing step to form a sea phase, and the (meth)acrylate resin has gathered to form island phases.

The average size of the island phases of the sea-island structure can be controlled by, for example, increasing or decreasing the amount of the styrene resin particle dispersion or the amount of the at least two (meth)acrylates used in the composite resin particle forming step, or by increasing or decreasing the length of time of maintaining a high temperature in the fusing and coalescing step.

The pressure sensitive adhesive base particle having a core-shell structure is produced through the following steps, for example:
  after an aggregated particle dispersion is obtained, a step of mixing the aggregated particle dispersion and a styrene resin particle dispersion so that the styrene resin particles further attach to the surfaces of the aggregated particles and form second aggregated particles; and
  a step of heating the second aggregated particle dispersion in which the second aggregated particles are dispersed so as to fuse and coalesce the second aggregated particles and thereby form pressure sensitive adhesive base particles having a core-shell structure.

The pressure sensitive adhesive base particle having a core-shell structure obtained through the aforementioned steps has a shell layer containing a styrene resin. Instead of the styrene resin particle dispersion, a resin particle dispersion in which a different type of resin particles are dispersed may be used to form a shell layer that contains the different type of resin.

After completion of the fusing and coalescing step, the pressure sensitive adhesive base particle formed in the solution is subjected to a washing step, a solid-liquid separation step, and a drying step known in the art so as to obtain a dry pressure sensitive adhesive base particle. From the viewpoint of chargeability, the washing step may involve thorough displacement washing with ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The pressure sensitive adhesive particles of this exemplary embodiment are formed by, for example, adding an external additive to the obtained dry pressure sensitive adhesive base particle, and mixing the resulting mixture. Mixing may be performed by using a V blender, a HENSCHEL mixer, a Lodige mixer, or the like. Furthermore, if needed, a vibrating screen, an air screen, or the like may be used to remove coarse particles.

The surface roughness Ra of the pressure sensitive adhesive particle can be adjusted by the order in which the external additive is added to the pressure sensitive adhesive base particle. For example, multiple external additives having different particle diameters from each other are used in combination, and an external additive having a relatively small particle diameter is externally added first to attach to the pressure sensitive adhesive base particle, and then an external additive having a relatively large particle diameter is externally added so as to form a roughness on the surface of the pressure sensitive adhesive base particle.

Alternatively, the surface roughness Ra of the pressure sensitive adhesive particle can be adjusted by using multiple external additives having specific gravities different from each other and controlling the stirring speed during mixing and stirring of the pressure sensitive adhesive base particle and the external additives. In other words, by controlling the stirring speed, an external additive having a relatively large specific gravity attaches to the pressure sensitive adhesive base particle first and then an external additive having a relatively small specific gravity attaches to the pressure sensitive adhesive base particle so as to form a roughness on the surface of the pressure sensitive adhesive base particle.

Cartridge

A cartridge according to an exemplary embodiment stores the pressure sensitive adhesive particle of the exemplary embodiment and is detachably attachable to a printed material producing apparatus. When the cartridge is attached to a printed material producing apparatus, the cartridge connects to an applying section that constitutes a part of the printed material producing apparatus and that applies the pressure sensitive adhesive particle onto a recording medium via a supply pipe.

When the pressure sensitive adhesive particle is supplied from the cartridge to the applying section and the amount of the pressure sensitive adhesive particles stored in the cartridge has decreased, the cartridge is replaced. Apparatus and method for producing printed material, and printed material An apparatus for producing a printed material according to an exemplary embodiment includes an applying section that stores the pressure sensitive adhesive particle of the exemplary embodiment and applies the pressure sensitive adhesive particle onto a recording medium; and a pressure-bonding section that folds and pressure-bonds the recording medium or pressure-bonds the recording medium and another recording medium placed on top of each other.

The applying section is equipped with, for example, a providing device that provides the pressure sensitive adhesive particle onto a recording medium, and a fixing device that fixes the pressure sensitive adhesive particle on the recording medium onto the recording medium.

The pressure-bonding section is equipped with, for example, a folding device that folds a recording medium having the pressure sensitive adhesive particle applied thereon or a stacking device that stacks another recording medium on the recording medium having the pressure sensitive adhesive particle applied thereon; and a pressurizing device that pressurizes the folded recording medium or the recording media placed on top of each other.

The pressurizing device in the pressure-bonding section applies a pressure to a recording medium having a pressure sensitive adhesive particle applied thereon. In this manner, the pressure sensitive adhesive particle is fluidized and exhibits adhesiveness on the recording medium.

A method for producing a printed material of this exemplary embodiment is performed by using the apparatus for producing a printed material of this exemplary embodiment. The method for producing a printed material according to the exemplary embodiment includes an applying step of using the pressure sensitive adhesive particle of the exemplary embodiment and applying the pressure sensitive adhesive particle onto a recording medium; and a pressure bonding step of folding and pressure-bonding the recording medium or pressure-bonding the recording medium and another recording medium placed on top of each other.

The applying step includes, for example, a step of providing the pressure sensitive adhesive particle onto a recording medium and a step of fixing the pressure sensitive adhesive particle on the recording medium onto the recording medium.

The pressure bonding step includes, for example, a step of folding the recording medium or stacking another recording medium on the recording medium, and a step of pressurizing the folded recording medium or the recording media placed on top of each other.

The pressure sensitive adhesive particle may be applied over the entire surface of the recording medium or in one part of the recording medium. One layer or two or more layers of the pressure sensitive adhesive particles are applied on the recording medium. The layer of the pressure sensitive adhesive particles may be a layer continuous in the surface direction of the recording medium or a layer discontinuous in the surface direction of the recording medium. The layer of the pressure sensitive adhesive particles may be a layer in which the pressure sensitive adhesive particles are aligned as particles or a layer in which adjacent pressure sensitive adhesive particles are fused and aligned with each other.

The amount of the pressure sensitive adhesive particles (preferably, transparent pressure sensitive adhesive particles) on the recording medium applied in the region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles (preferably, transparent pressure sensitive adhesive particles) on the recording medium is, for example, 0.2 μm or more and 25 μm or less, 0.4 μm or more and 20 μm or less, or 0.6 μm or more and 15 μm or less.

Examples of the recording medium used in the apparatus for producing a printed material according to this exemplary embodiment include paper, coated paper obtained by coating the surface of paper with a resin or the like, cloths, nonwoven cloths, resin films, and resin sheets. The recording medium may have an image on one surface or both surfaces.

Although some examples of the apparatus for producing a printed material according to the present exemplary embodiment are described below, the exemplary embodiments are not limited to these.

FIG. 1 is a schematic diagram of an example of an apparatus for producing a printed material according to this exemplary embodiment. The apparatus for producing a printed material illustrated in FIG. 1 is equipped with an applying section 100 and a pressure-bonding section 200 downstream of the applying section 100. The arrow indicates the direction in which the recording medium is conveyed.

The applying section 100 is a device that applies the pressure sensitive adhesive particle of the exemplary embodiment on a recording medium P. The recording medium P has an image formed on one or both surfaces in advance.

The applying section 100 is equipped with a providing device 110 and a fixing device 120 disposed downstream of the providing device 110.

The providing device 110 provides pressure sensitive adhesive particles M onto a recording medium P. Examples of the providing method employed by the providing device 110 include a spraying method, a bar coating method, a die coating method, a knife coating method, a roll coating method, a reverse roll coating method, a gravure coating method, a screen printing method, an ink jet method, a lamination method, and an electrophotographic method. Depending on the providing method, the pressure sensitive adhesive particles M may be dispersed in a dispersion medium to prepare a liquid composition, and the providing device 110 may use the liquid composition.

The recording medium P having the pressure sensitive adhesive particles M provided thereon by the providing device 110 is conveyed to the fixing device 120.

Examples of the fixing device 120 include a heating device that has a heating source and heats the pressure sensitive adhesive particles M on the recording medium P passing therethrough to fix the pressure sensitive adhesive particles M onto the recording medium P; a pressurizing device that has a pair of pressurizing members (roll/roll or belt/roll) and pressurizes the recording medium P passing therethrough to fix the pressure sensitive adhesive particles M onto the recording medium P; and a pressurizing and heating device that has a pair of pressurizing members (roll/roll or belt/roll) equipped with a built-in heating source and pressurizes and heats the recording medium P passing therethrough to fix the pressure sensitive adhesive particles M onto the recording medium P.

When the fixing device 120 has a heating source inside, the surface temperature of the recording medium P heated by the heating device 120 is preferably 10° C. or more and 80° C. or less, more preferably 20° C. or more and 60° C. or less, and yet more preferably 30° C. or more and 50° C. or less.

When the fixing device 120 has a pressurizing member, the pressure applied to the recording medium P from the pressurizing member may be lower than the pressure applied to the recording medium P2 from the pressurizing device 230.

The recording medium P passes the applying section 100 and thus becomes a recording medium P1 having pressure sensitive adhesive particles M provided on the image. The recording medium P1 is conveyed toward the pressure-bonding section 200.

In the apparatus for producing a printed material according to this exemplary embodiment, the applying section 100 and the pressure-bonding section 200 may be close to each other or distant from each other. When the applying section 100 and the pressure-bonding section 200 are distant from each other, the applying section 100 and the pressure-bonding section 200 are, for example, linked via a conveying section (for example, a belt conveyor) that conveys the recording medium P1.

The pressure-bonding section 200 is equipped with a folding device 220 and a pressurizing device 230, and folds and pressure-bonds the recording medium P1.

The folding device 220 folds the recording medium P1 passing therethrough to prepare a folded recording medium P2. The way in which the recording medium P2 is folded may be in two, in three, or in four, and only part of the recording medium P2 may be in fold. The recording medium P2 is in a state in which the pressure sensitive adhesive particles M are applied to at least part of at least one surface of opposing two surfaces of flaps.

The folding device 220 may have a pair of pressurizing members (for example, roll/roll or belt/roll) that apply a pressure to the recording medium P2. The pressure which the pressurizing members of the folding device 220 apply to the recording medium P2 may be lower than the pressure which the pressurizing device 230 applies to the recording medium P2.

The pressure-bonding section 200 may be equipped with a stacking device that places another medium on top of the recording medium P1 instead of the folding device 220. The form of superimposition of the recording medium P1 and another recording medium may be such that one recording medium is stacked on the recording medium P1 or that one recording medium is stacked on each of multiple sections of the recording medium P1. This other recording medium may have an image formed on one or both surfaces in advance, may be free of any image, or may be a pressure-bonded printed material prepared in advance.

The recording medium P2 exits the folding device 220 (or stacking device) and is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the passing recording medium P2. The pair of pressurizing members in the pressurizing device 230 is not limited to the combination of pressurizing rolls and may be a combination of a pressurizing roll and a pressurizing belt or a combination of a pressurizing belt and a pressurizing belt.

When a pressure is applied to the recording medium P2 passing the pressurizing device 230, the pressure sensitive adhesive particles M on the recording medium P2 are fluidized under pressure and exhibit adhesiveness.

The pressurizing device 230 may have a heating source (for example, a halogen heater) inside for heating the recording medium P2, but this is optional. The pressurizing device 230 may have no heating source inside, and this does not exclude the case in which the temperature inside the pressurizing device 230 increases to a temperature equal to or more than the environment temperature due to heat from a motor in the pressurizing device 230 or the like.

As the recording medium P2 passes the pressurizing device 230, the surfaces of the overlapping flaps of the recording medium P2 become bonded with each other with the pressure sensitive adhesive particles M, and a pressure-bonded printed material P3 is obtained. Two opposing surfaces of the flaps of the pressure-bonded printed material P3 are bonded to each other partly or entirely.

The finished pressure-bonded printed material P3 is discharged from the pressurizing device 230.

A first model of the pressure-bonded printed material P3 is a pressure-bonded printed material in which a folded recording medium has opposing surfaces of flaps bonded to each other with the pressure sensitive adhesive particles M. The pressure-bonded printed material P3 of this model is produced by the apparatus for producing a printed material equipped with a folding device 220.

A second model of the pressure-bonded printed material P3 is a pressure-bonded printed material in which multiple recording media placed on top of each other have opposing surfaces bonded to each other with the pressure sensitive adhesive particles M. The pressure-bonded printed material P3 of this model is produced by the apparatus for forming a printed material equipped with a stacking device.

The apparatus for producing a printed material according to this exemplary embodiment is not limited to a type that continuously conveys the recording medium P2 from the folding device 220 (or stacking device) to the pressurizing device 230. The apparatus for producing a printed material according to this exemplary embodiment may be of a type that stocks the recording media P2 discharged from the folding device 220 (or stacking device) and conveys the recording media P2 to the pressurizing device 230 after a predetermined amount of the recording media P2 are stored.

In the apparatus for producing a printed material according to this exemplary embodiment, the folding device 220 (or stacking device) and the pressurizing device 230 may be close to each other or distant from each other. When the folding device 220 (or stacking device) and the pressurizing device 230 are distant from each other, the folding device 220 (of stacking device) and the pressurizing device 230 are, for example, linked via a conveying section (for example, a belt conveyor) that conveys the recording medium P2.

The apparatus for producing a printed material according to this exemplary embodiment may be equipped with a cutting section that cuts the recording medium into a predetermined size. Examples of the cutting section include a cutting section that is disposed between the applying section 100 and the pressure-bonding section 200 and cuts off a part of the recording medium P1, the part being a region where no pressure sensitive adhesive particles M are applied; a cutting section that is disposed between the folding device 220 and the pressurizing device 230 and cuts off a part of the recording medium P2, the part being a region where no pressure sensitive adhesive particles M are applied; and a cutting section that is disposed downstream of the pressure-bonding section 200 and cuts off a part of the pressure-bonded printed material P3, the part being a region not bonded with the pressure sensitive adhesive particles M.

The apparatus for producing a printed material according to this exemplary embodiment is not limited to a single-sheet type. The apparatus for producing a printed material according to this exemplary embodiment may be of a type that performs an applying step and a pressure bonding step on a long recording medium to form a long pressure-bonded printed material, and then cuts the long pressure-bonded printed material into a predetermined size. Sheet for producing printed material and method for producing sheet for producing printed material A sheet for producing a printed material according to an exemplary embodiment includes a substrate and pressure sensitive adhesive particles applied to the substrate. The sheet for producing a printed material according to this exemplary embodiment is produced by using the pressure sensitive adhesive particles of the exemplary embodiment. The pressure sensitive adhesive particles on the substrate may or may not keep the particle shape from before being applied on the substrate.

The sheet for producing a printed material according to this exemplary embodiment serves as, for example, a masking sheet to be placed on and bonded to a recording medium to conceal information recorded on the recording medium, or as a releasing sheet used to form an adhesive layer on a recording medium when recording media placed on top of each other are to be bonded.

Examples of the substrate that serves as the sheet for producing a printed material according to the exemplary embodiment include paper, coated paper obtained by coating the surface of paper with a resin or the like, cloths, nonwoven cloths, resin films, and resin sheets. The substrate may have an image formed on one or both surfaces.

In the sheet for producing a printed material according to this exemplary embodiment, the pressure sensitive adhesive particles may be applied over the entire surface of or in one part of the substrate. One layer or two or more layers of the pressure sensitive adhesive particles are applied on the substrate. The layer of the pressure sensitive adhesive particles may be a layer continuous in the surface direction of the substrate or a layer discontinuous in the surface direction of the substrate. The layer of the pressure sensitive adhesive particles may be a layer in which the pressure sensitive adhesive particles are aligned as particles or a layer in which adjacent pressure sensitive adhesive particles are fused and aligned with each other.

The amount of the pressure sensitive adhesive particles on the substrate applied in the region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles on the substrate is, for example, 0.2 μm or more and 25 μm or less, 0.4 μm or more and 20 μm or less, or 0.6 μm or more and 15 μm or less.

The sheet for producing a printed material according to the exemplary embodiment is produced by, for example, a production method that includes an applying step of using the pressure sensitive adhesive particle of the exemplary embodiment and applying the pressure sensitive adhesive particle onto a substrate.

The applying step includes, for example, a providing step of providing the pressure sensitive adhesive particles onto a substrate and a fixing step of fixing the pressure sensitive adhesive particles on the substrate onto the recording substrate.

The providing step is performed by a providing method such as a spraying method, a bar coating method, a die coating method, a knife coating method, a roll coating method, a reverse roll coating method, a gravure coating method, a screen printing method, an ink jet method, a lamination method, or an electrophotographic method, for example. Depending on the providing method employed in the providing step, the pressure sensitive adhesive particles may be dispersed in a dispersion medium to prepare a liquid composition, and the liquid composition may be used the providing step.

The fixing step is, for example, a heating step of heating pressure sensitive adhesive particles on the substrate with a heating source to fix the pressure sensitive adhesive particles onto the substrate; a pressurizing step of pressurizing the substrate having the pressure sensitive adhesive particles provided thereon with a pair of pressurizing members (roll/roll or belt/roll) to fix the pressure sensitive adhesive particles onto the substrate; or a pressurizing and heating step of pressurizing and heating a substrate having the pressure sensitive adhesive particles provided thereon with a pair of pressurizing members (roll/roll or belt/roll) to fix the pressure sensitive adhesive particles onto the substrate.

Producing Printed Material by Electrophotographic Method

An exemplary embodiment in which the pressure sensitive adhesive particles of the present exemplary embodiment are used in the electrophotographic method will now be described. In the electrophotographic method, the pressure sensitive adhesive particles correspond to a toner. In the description below, the pressure sensitive adhesive particles are referred to as a toner, and the pressure sensitive adhesive base particles are referred to as toner particles.

Electrostatic Charge Image Developer

An electrostatic charge image developer of this exemplary embodiment contains at least a toner according to an exemplary embodiment. The electrostatic charge image developer of the exemplary embodiment may be a one-component developer that contains only the toner of the exemplary embodiment or a two-component developer that is a mixture of the toner of the exemplary embodiment and a carrier.

The carrier is not particularly limited and may be any known carrier. Examples of the carrier include a coated carrier prepared by covering the surface of a magnetic powder core with a resin, a magnetic powder-dispersed carrier prepared by dispersing and blending magnetic powder in a matrix resin, and a resin-impregnated carrier prepared by impregnating porous magnetic powder with a resin. The magnetic powder-dispersed carrier and the resin-impregnated carrier may each be a carrier that has a core being composed of the particles constituting the carrier and having a resin-coated surface.

Examples of the magnetic powder include magnetic metals such as iron, nickel, and cobalt, and magnetic oxides such as ferrite and magnetite.

Examples of the resin for coating and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond and modified products thereof, fluororesin, polyester, polycarbonate, phenolic resin, and epoxy resin. The resin for coating and the matrix resin may contain other additives, such as conductive particles. Examples of the conductive particles include particles of metals such as gold, silver, and copper, and particles of carbon black, titanium oxide, zinc oxide, tin oxide, barium sulfate, aluminum borate, and potassium titanate.

An example of the method for covering the surface of the core with the resin is a method that involves coating the surface of the core with a coating layer-forming solution prepared by dissolving the resin for coating and various additives (used as needed) in an appropriate solvent. The solvent is not particularly limited and may be selected by considering the type of the resin to be used, suitability of application, etc.

Specific examples of the resin coating method include a dipping method involving dipping cores in the coating-layer-forming solution, a spraying method involving spraying the coating-layer-forming solution onto core surfaces, a fluid bed method involving spraying a coating-layer-forming solution while having the cores float on a bed of air, and a kneader coater method involving mixing cores serving as carriers and a coating-layer-forming solution in a kneader coater and then removing the solvent.

In a two-component developer, the toner-to-carrier mixing ratio (mass ratio) is preferably 1:100 to 30:100 and is more preferably 3:100 to 20:100.

Apparatus and Method for Producing Printed Material

An apparatus for producing a printed material according to an exemplary embodiment that employs an electrophotographic method includes an applying section that stores a developer that contains the toner of the exemplary embodiment and electrophotographically applied the toner onto a recording medium; and a pressure-bonding section that folds and pressure-bonds the recording medium or pressure-bonds the recording medium and another recording medium placed on top of each other.

The method for producing a printed material of this exemplary embodiment by an electrophotographic method is performed by using the apparatus for producing a printed material of this exemplary embodiment. The method for producing a printed material according to an exemplary embodiment includes an applying step of electrophotographically applying a toner of the exemplary embodiment by using a developer that contains the toner; and a pressure bonding step of folding and pressure-bonding the recording medium or pressure-bonding the recording medium and another recording medium placed on top of each other.

The applying section included in the apparatus for producing a printed material according to this exemplary embodiment includes, for example, a photoreceptor, a charging section that charges a surface of the photoreceptor, an electrostatic charge image forming section that forms an electrostatic charge image on the charged surface of the photoreceptor, a developing section that stores the electrostatic charge image developer of the exemplary embodiment and develops the electrostatic charge image on the surface of the photoreceptor into a toner image by using the electrostatic charge image developer, and a transfer section that transfers the toner image on the surface of the photoreceptor onto a surface of a recording medium. The applying section may further include a fixing section that fixes the toner image on the surface of the recording medium.

The applying step included in the method for producing a printed material according to this exemplary embodiment includes, for example, a charging step of charging a surface of a photoreceptor, an electrostatic charge image forming step of forming an electrostatic charge image on the charged surface of the photoreceptor, a developing step of developing the electrostatic charge image on the surface of the photoreceptor into a toner image by using the electrostatic charge image developer of the exemplary embodiment, and a transfer step of transferring the toner image on the surface of the photoreceptor onto a surface of a recording medium. The applying step may further include a fixing step of fixing the toner image on the surface of the recording medium.

The applying section is, for example, a direct transfer type device with which a toner image on the surface of the photoreceptor is directly transferred onto a recording medium; an intermediate transfer type device with which a toner image on the surface of the photoreceptor is first transferred onto a surface of an intermediate transfer body and then the toner image on the intermediate transfer body is transferred onto a surface of a recording medium; a device equipped with a cleaning section that cleans the surface of the photoreceptor before charging and after the transfer of the toner image; and a device equipped with a charge erasing section that erases charges on the surface of the photoreceptor by applying charge erasing light after the transfer of the toner image and before charging. When the applying section is of an intermediate transfer type, the transfer section includes, for example, an intermediate transfer body having a surface onto which a toner image is transferred, a first transfer section that transfers the toner image on the surface of the photoreceptor onto the surface of the intermediate transfer body, and a second transfer section that transfers the toner image on the surface of the intermediate transfer body onto a surface of a recording medium.

A portion of the applying section that includes the developing section may be configured as a cartridge structure (process cartridge) that is detachably attachable to the applying section. A process cartridge that stores the electrostatic charge image developer of the exemplary embodiment and is equipped with a developing section, for example, is suitable as this process cartridge.

The pressure-bonding section included in the apparatus for producing a printed material according to this exemplary embodiment applies a pressure to a recording medium to which the toner of the exemplary embodiment is applied. In this manner, the toner of the exemplary embodiment is fluidized and exhibits adhesiveness on the recording medium. The pressure that the pressure-bonding section applies to the recording medium to fluidize the toner of the exemplary embodiment is preferably 3 MPa or more and 300 MPa or less, more preferably 10 MPa or more and 200 MPa or less, and yet more preferably 30 MPa or more and 150 MPa or less.

The toner of the exemplary embodiment may be applied to the entire surface of the recording medium or on some part of the recording medium. One layer or two or more layers of the toner of the exemplary embodiment are applied to the recording medium. The layer of the toner of the exemplary embodiment may be a layer continuous in the surface direction of the recording medium or a layer discontinuous in the surface direction of the recording medium. The layer of the toner of the exemplary embodiment may be a layer in which the toner particles are aligned as particles or a layer in which adjacent toner particles are fused and aligned with each other.

The amount of the toner (preferably a transparent toner) on the recording medium applied in the region is, for example, 0.5 g/m² or more and 50 g/m² or less, 1 g/m² or more and 40 g/m² or less, or 1.5 g/m² or more and 30 g/m² or less. The thickness of the layer of the toner (preferably a transparent toner) on the recording medium is, for example, 0.2 μm or more and 25 μm or less, 0.4 μm or more and 20 μm or less, or 0.6 μm or more and 15 μm or less.

Examples of the recording medium used in the apparatus for producing a printed material according to this exemplary embodiment include paper, coated paper obtained by coating the surface of paper with a resin or the like, cloths, nonwoven cloths, resin films, and resin sheets. The recording medium may have an image on one surface or both surfaces.

Although some examples of the apparatus for producing a printed material according to the present exemplary embodiment are described below, the exemplary embodiments are not limited to these.

Figure 2:
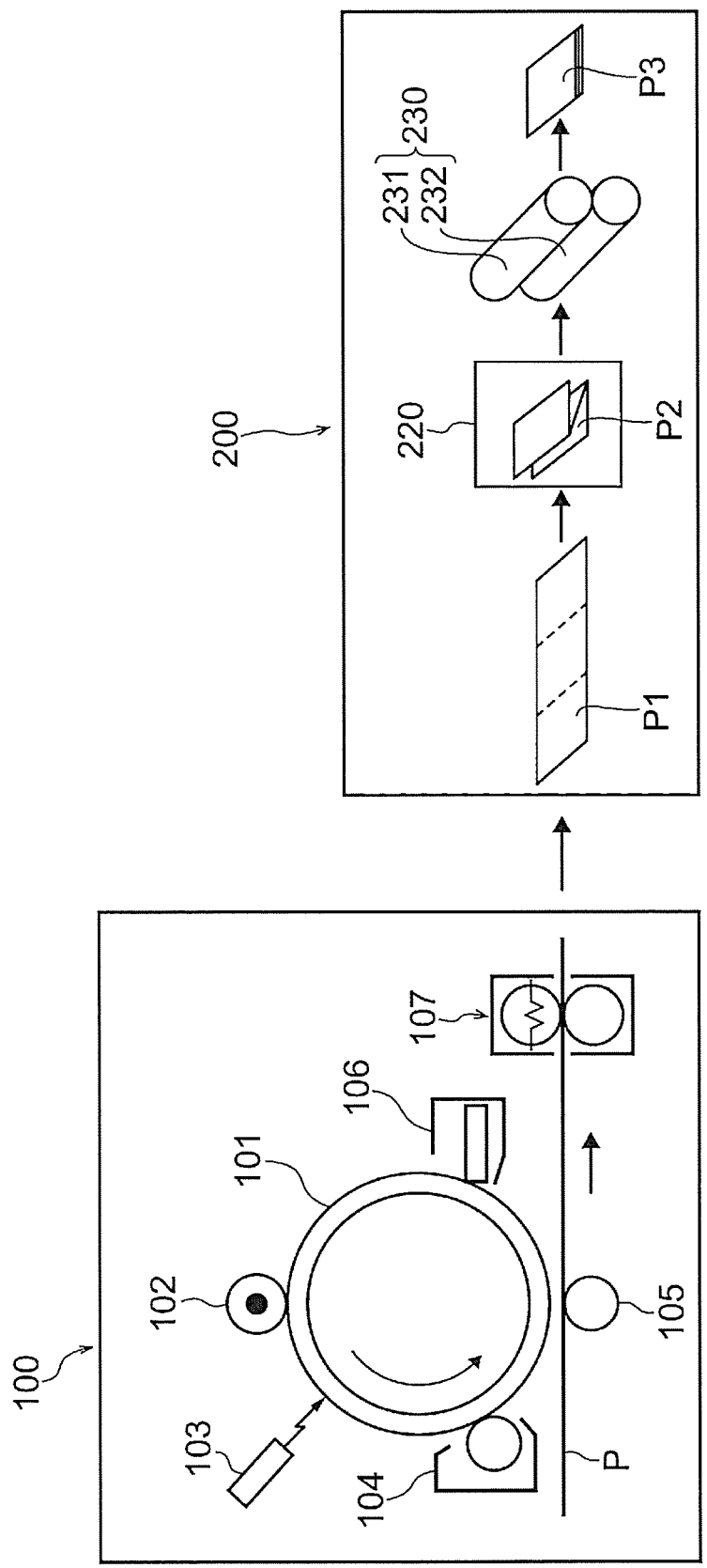
FIG. 2 is a schematic diagram of another example of an apparatus for producing a printed material according to an exemplary embodiment.

FIG. 2 is a schematic diagram of an example of an apparatus for producing a printed material according to this exemplary embodiment. The apparatus for producing a printed material illustrated in FIG. 2 is equipped with an applying section 100 and a pressure-bonding section 200 downstream of the applying section 100. The arrow indicates the direction in which the photoreceptor rotates or the recording medium is conveyed.

The applying section 100 is of a direct transfer type and uses a developer containing the toner of the exemplary embodiment to electrophotographically apply the toner of the exemplary embodiment on a recording medium P. The recording medium P has an image formed on one or both surfaces in advance.

The applying section 100 includes a photoreceptor 101. A charging roll (one example of the charging section) 102 that charges the surface of the photoreceptor 101, an exposing device (one example of the electrostatic charge image forming section) 103 that forms an electrostatic charge image by exposing the charged surface of the photoreceptor 101 with a laser beam, a developing device (one example of the developing section) 104 that develops the electrostatic charge image by supplying a toner to the electrostatic charge image, a transfer roll (one example of the transfer section) 105 that transfers the developed toner image onto the recording medium P, and a photoreceptor cleaning device (one example of the cleaning section) 106 that removes the toner remaining on the surface of the photoreceptor 101 after the transfer are provided around the photoreceptor 101.

The operation of the applying section 100 applying the toner of the exemplary embodiment to the recording medium P will now be described.

First, the surface of the photoreceptor 101 is charged by the charging roll 102. The exposing device 103 applies a laser beam onto the charged surface of the photoreceptor 101 in accordance to image data sent from a controller (not illustrated). As a result, an electrostatic charge image of an application pattern of the toner of this exemplary embodiment is formed on the surface of the photoreceptor 101.

The electrostatic charge image formed on the photoreceptor 101 is rotated to a developing position as the photoreceptor 101 is run. The electrostatic charge image on the photoreceptor 101 is developed and visualized by the developing device 104 at this developing position so as to form a toner image.

A developer that contains at least the toner of this exemplary embodiment and a carrier is stored in the developing device 104. The toner of this exemplary embodiment is frictionally charged as it is stirred with the carrier in the developing device 104, and is carried on the developer roll. As the surface of the photoreceptor 101 passes the developing device 104, the toner electrostatically adheres to the electrostatic charge image on the surface of the photoreceptor 101, and the electrostatic charge image is thereby developed with the toner. The photoreceptor 101 on which the toner image formed of the toner is formed is continuously run, and the developed toner image on the photoreceptor 101 is conveyed to a transfer position.

After the toner image on the photoreceptor 101 is conveyed to the transfer position, a transfer bias is applied to the transfer roll 105. An electrostatic force working from the photoreceptor 101 toward the transfer roll 105 also acts on the toner image, and, thus, the toner image on the photoreceptor 101 is transferred onto the recording medium P.

The toner remaining on the photoreceptor 101 is removed by the photoreceptor cleaning device 106 and recovered. The photoreceptor cleaning device 106 is, for example, a cleaning blade or a cleaning brush. From the viewpoint of suppressing the phenomenon in which the toner of the exemplary embodiment remaining on the surface of the photoreceptor fluidizes under a pressure and attaches to the surface of the photoreceptor while forming a film, the photoreceptor cleaning device 106 may be a cleaning brush.

The recording medium P onto which the toner image has been transferred is conveyed to a fixing device (one example of the fixing section) 107. The fixing device 107 is, for example, a pair of fixing members (roll/roll or belt/roll). The applying section 100 is not necessarily equipped with a fixing device 107; however, from the viewpoint of suppressing detachment of the toner of the exemplary embodiment from the recording medium P, the applying section 100 is preferably equipped with a fixing device 107. The pressure which the fixing device 107 applies to the recording medium P may be lower than the pressure which the pressurizing device 230 applies to the recording medium P2, and may specifically be 0.2 MPa or more and 1 MPa or less.

The fixing device 107 may have a heating source (for example, a halogen heater) for heating the recording medium P inside, but this is optional. When the fixing device 107 has a heating source inside, the surface temperature of the recording medium P heated by the heating source is preferably 150° C. or more and 220° C. or less, more preferably 155° C. or more and 210° C. or less, and yet more preferably 160° C. or more and 200° C. or less. The fixing device 107 may have no heating source inside, and this does not exclude that the temperature inside the fixing device 107 increases to a temperature equal to or more than the environment temperature due to heat from a motor in the applying section 100 or the like.

The recording medium P passes the applying section 100 and thus becomes a recording medium P1 having an image on which the toner of the exemplary embodiment is provided. The recording medium P1 is conveyed toward the pressure-bonding section 200.

In the apparatus for producing a printed material according to this exemplary embodiment, the applying section 100 and the pressure-bonding section 200 may be close to each other or distant from each other. When the applying section 100 and the pressure-bonding section 200 are distant from each other, the applying section 100 and the pressure-bonding section 200 are, for example, linked via a conveying section (for example, a belt conveyor) that conveys the recording medium P1.

The pressure-bonding section 200 is equipped with a folding device 220 and a pressurizing device 230, and folds and pressure-bonds the recording medium P1.

The folding device 220 folds the recording medium P1 passing therethrough to prepare a folded recording medium P2. The way in which the recording medium P2 is folded may be in two, in three, or in four, and only part of the recording medium P2 may be in fold. The recording medium P2 is in a state in which the toner of the exemplary embodiment is applied to at least part of at least one surface of opposing two surfaces.

The folding device 220 may have a pair of pressurizing members (for example, roll/roll or belt/roll) that apply a pressure to the recording medium P2. The pressure which the pressurizing members of the folding device 220 apply to the recording medium P2 may be lower than the pressure which the pressurizing device 230 applies to the recording medium P2, and may specifically be 1 MPa or more and 10 MPa or less.

The pressure-bonding section 200 may be equipped with a stacking device that places another medium on top of the recording medium P1 instead of the folding device 220. The form of a stack of the recording medium P1 and another recording medium may be such that one recording medium is stacked on the recording medium P1 or that one recording medium is stacked on each of multiple sections of the recording medium P1. This other recording medium may have an image formed on one or both surfaces in advance, may be free of any image, or may be a pressure-bonded printed material prepared in advance.

The recording medium P2 exits the folding device 220 (or stacking device) and is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the passing recording medium P2. The pair of pressurizing members in the pressurizing device 230 is not limited to the combination of pressurizing rolls and may be a combination of a pressurizing roll and a pressurizing belt or a combination of a pressurizing belt and a pressurizing belt.

When a pressure is applied to the recording medium P2 passing the pressurizing device 230, the toner of the exemplary embodiment on the recording medium P2 is fluidized under pressure and exhibits adhesiveness. The pressure that the pressurizing device 230 applies to the recording medium P2 is preferably 3 MPa or more and 300 MPa or less, more preferably 10 MPa or more and 200 MPa or less, and yet more preferably 30 MPa or more and 150 MPa or less.

The pressurizing device 230 may have a heating source (for example, a halogen heater) inside for heating the recording medium P2, but this is optional. When the pressurizing device 230 has a heating source inside, the surface temperature of the recording medium P2 heated by the heating source is preferably 30° C. or more and 120° C. or less, more preferably 40° C. or more and 100° C. or less, and yet more preferably 50° C. or more and 90° C. or less. The pressurizing device 230 may have no heating source inside, and this does not exclude that the temperature inside the pressurizing device 230 increases to a temperature equal to or more than the environment temperature due to heat from a motor in the pressurizing device 230 or the like.

As the recording medium P2 passes the pressurizing device 230, the surfaces of the overlapping flaps of the recording medium P2 become bonded with each other with the fluidized toner of the exemplary embodiment, and a pressure-bonded printed material P3 is obtained. The opposing surfaces of the overlapping flaps of the pressure-bonded printed material P3 are partly or entirely bonded to each other.

The finished pressure-bonded printed material P3 is discharged from the pressurizing device 230.

A first model of the pressure-bonded printed material P3 is a pressure-bonded printed material in which a folded recording medium has opposing surfaces of flaps bonded to each other with the toner of the exemplary embodiment. The pressure-bonded printed material P3 of this model is produced by the apparatus for producing a printed material equipped with a folding device 220.

A second model of the pressure-bonded printed material P3 is a pressure-bonded printed material in which multiple recording media placed on top of each other have opposing surfaces bonded to each other with the toner of the exemplary embodiment. The pressure-bonded printed material P3 of this model is produced by the pressure-bonded printed material producing apparatus equipped with a stacking device.

The apparatus for producing a printed material according to this exemplary embodiment is not limited to a type that continuously conveys the recording medium P2 from the folding device 220 (or stacking device) to the pressurizing device 230. The apparatus for producing a printed material according to this exemplary embodiment may be of a type that stocks the recording media P2 discharged from the folding device 220 (or stacking device) and conveys the recording media P2 to the pressurizing device 230 after a predetermined amount of the recording media P2 are stored.

In the apparatus for producing a printed material according to this exemplary embodiment, the folding device 220 (or stacking device) and the pressurizing device 230 may be close to each other or distant from each other. When the folding device 220 (or stacking device) and the pressurizing device 230 are distant from each other, the folding device 220 (of stacking device) and the pressurizing device 230 are, for example, linked via a conveying section (for example, a belt conveyor) that conveys the recording medium P2.

The apparatus for producing a printed material according to this exemplary embodiment may be equipped with a cutting section that cuts the recording medium into a predetermined size. Examples of the cutting section include a cutting section that is disposed between the applying section 100 and the pressure-bonding section 200 and cuts off a part of the recording medium P1, the part being a region where no toner of the exemplary embodiment is applied; a cutting section that is disposed between the folding device 220 and the pressurizing device 230 and cuts off a part of the recording medium P2, the part being a region where no toner of the exemplary embodiment is applied; and a cutting section that is disposed downstream of the pressure-bonding section 200 and cuts off a part of the pressure-bonded printed material P3, the part being a region not bonded with the toner of the exemplary embodiment.

The apparatus for producing a printed material according to this exemplary embodiment is not limited to a single-sheet type. The apparatus for producing a printed material according to this exemplary embodiment may be of a type that performs an applying step and a pressure bonding step on a long recording medium to form a long pressure-bonded printed material, and then cuts the long pressure-bonded printed material into a predetermined size.

The apparatus for producing a printed material according to this exemplary embodiment may further include a color image forming section that forms a color image on a recording medium by an electrophotographic method by using a color electrostatic charge image developer. The color image forming section is equipped with, for example, a photoreceptor, a charging section that charges a surface of the photoreceptor, an electrostatic charge image forming section that forms an electrostatic charge image on the charged surface of the photoreceptor, a developing section that stores a color electrostatic charge image developer and develops the electrostatic charge image on the surface of the photoreceptor into a color toner image by using the color electrostatic charge image developer, a transfer section that transfers the color toner image on the surface of the photoreceptor onto a surface of a recording medium, and a thermal fixing section that thermally fixes the color toner image transferred onto the surface of the recording medium.

The above-described production apparatus is used to implement the method for producing a printed material of the exemplary embodiment, the method further including a color image forming step of forming a color image on the recording medium by an electrophotographic method using a color electrostatic charge image developer. The color image forming step includes, specifically, a charging step of charging a surface of a photoreceptor, an electrostatic charge image forming step of forming an electrostatic charge image on the charged surface of the photoreceptor, a developing step of developing the electrostatic charge image on the surface of the photoreceptor into a color toner image by using a color electrostatic charge image developer, a transfer step of transferring the color toner image on the surface of the photoreceptor onto a surface of a recording medium, and a thermal fixing step of thermally fixing the color toner image transferred onto the surface of the recording medium.

Examples of the color image forming section included in the apparatus for producing a printed material according to the exemplary embodiment include: a direct transfer type device with which a color toner image on the surface of the photoreceptor is directly transferred onto a recording medium; an intermediate transfer type device with which a color toner image on the surface of the photoreceptor is first transferred onto a surface of an intermediate transfer body and then the color toner image on the intermediate transfer body is transferred onto a surface of a recording medium; a device equipped with a cleaning section that cleans the surface of the photoreceptor before charging and after the transfer of the color toner image; and a device equipped with a charge erasing section that erases charges on the surface of the photoreceptor by applying charge erasing light after the transfer of the color toner image and before charging. When the color image forming section is an intermediate transfer type device, the transfer section has, for example, an intermediate transfer body having a surface to which a color toner image is transferred, a first transfer section that transfers (first transfer) the color toner image on the surface of the photoreceptor onto a surface of the intermediate transfer body, and a second transfer section that transfers (second transfer) the color toner image on the surface of the intermediate transfer body onto a surface of a recording medium.

In the apparatus for producing a printed material according to this exemplary embodiment, when the applying section for applying the toner of the exemplary embodiment and a color image forming section both employ an intermediate transfer method, the applying section and the color image forming section may share the intermediate transfer body and the second transfer section.

In the apparatus for producing a printed material according to this exemplary embodiment, the applying section that applies an image developer containing the toner of the exemplary embodiment and the color image forming section may share the thermal fixing section.

Other examples of the apparatus for producing a printed material according to the exemplary embodiment equipped with a color image forming section are described below, but these examples are not limiting. Only relevant parts illustrated in the drawing are described in the description below, and descriptions of other parts are omitted.

Figure 3:
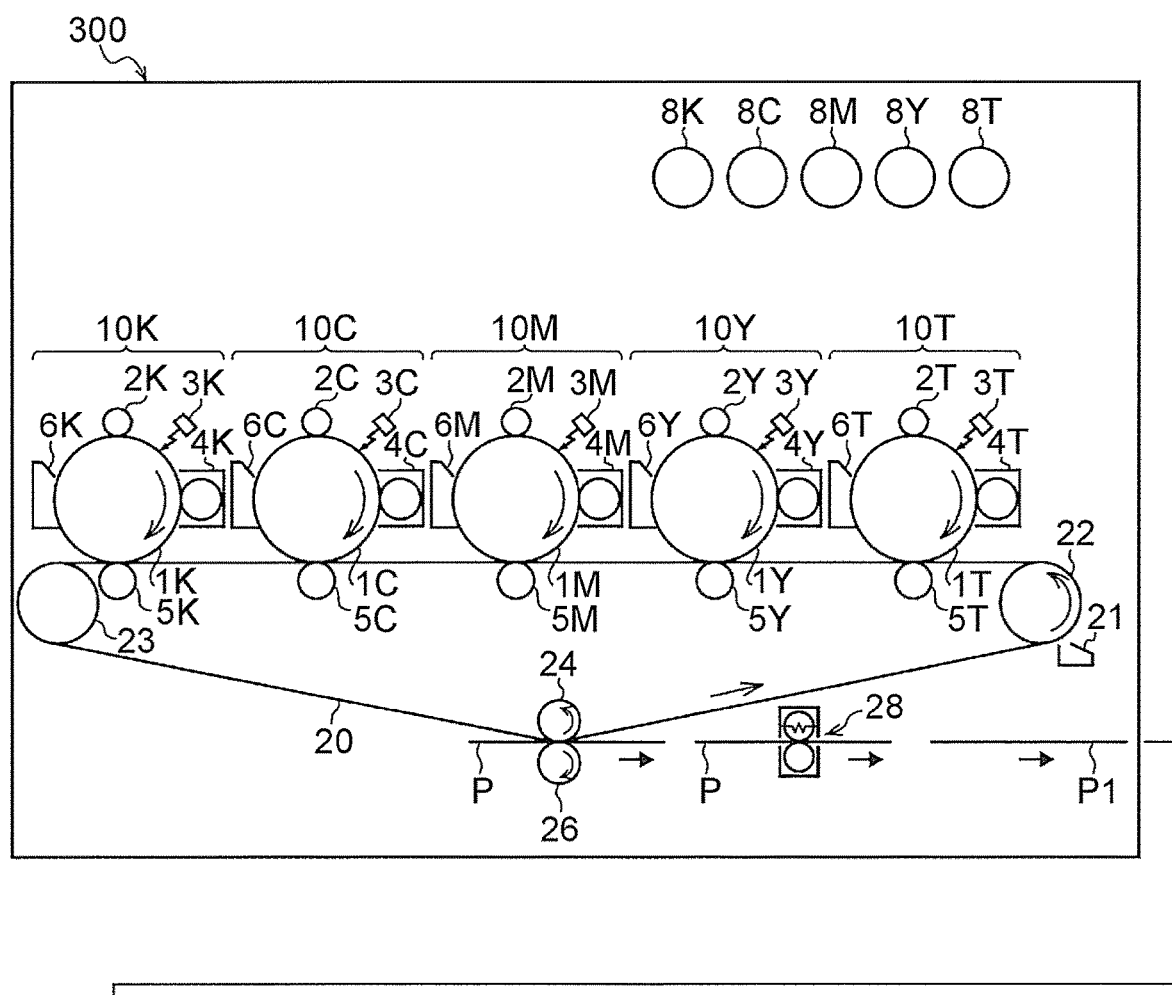
FIG. 3 is a schematic diagram of yet another example of an apparatus for producing a printed material according to an exemplary embodiment.
Figure 3:
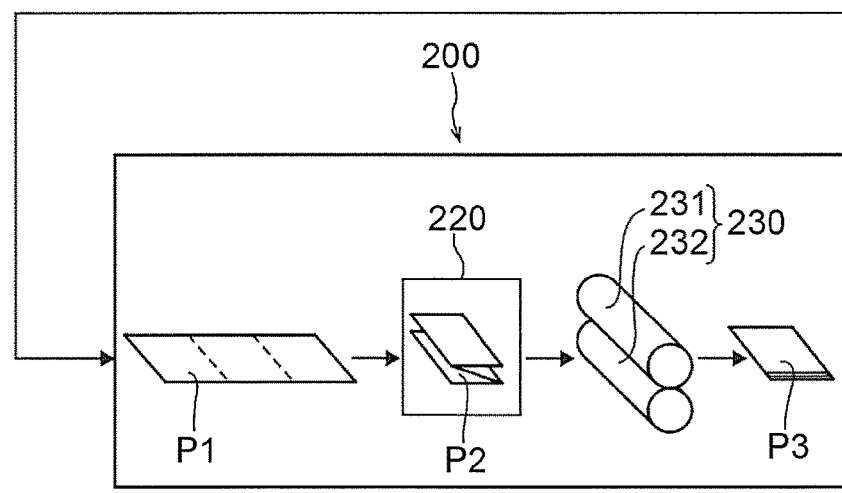

FIG. 3 is a schematic diagram of an example of an apparatus for producing a printed material according to this exemplary embodiment. The apparatus for producing a printed material illustrated in FIG. 3 is equipped with a printing section 300 that applied the toner of the exemplary embodiment to a recording medium and forms a color image on the recording medium, and a pressure-bonding section 200 disposed downstream of the printing section 300.

The printing section 300 is a five-stand-tandem intermediate transfer-type printing section. The printing section 300 is equipped with a unit 10T that applies the toner (T) of the exemplary embodiment, and units 10Y, 10M, 10C, and 10K that respectively form yellow (Y), magenta (M), cyan (C), and black (K) images. The unit 10T is the applying section that applies the toner of the exemplary embodiment to the recording medium P by using a developer that contains the toner of the exemplary embodiment. Each of the units 10Y, 10M, 10C, and 10K is a section that forms a color image on the recording medium P by using a developer that contains a color toner. The units 10T, 10Y, 10M, 10C, and 10K employ an electrophotographic system.

The units 10T, 10Y, 10M, 10C, and 10K are disposed side by side with spaces therebetween in the horizontal direction. The units 10T, 10Y, 10M, 10C, and 10K may each be a process cartridge detachably attachable to the printing section 300.

An intermediate transfer belt (one example of the intermediate transfer body) 20 extends below and throughout the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and runs in a direction from the unit 10T to the unit 10K. An intermediate transfer body cleaning device 21 is installed on the image carrying surface side of the intermediate transfer belt 20 so as to face the driving roll 22.

The units 10T, 10Y, 10M, 10C, and 10K are respectively equipped with developing devices (examples of the developing sections) 4T, 4Y, 4M, 4C, and 4K. The toner of the exemplary embodiment, a yellow toner, a magenta toner, a cyan toner, and a black toner stored in the toner cartridges 8T, 8Y, 8M, 8C, and 8K are respectively supplied to the developing devices 4T, 4Y, 4M, 4C, and 4K.

Since the units 10T, 10Y, 10M, 10C and 10K are identical in structure and in operation, the unit 10T that applies the toner this exemplary embodiment to the recording medium is described as a representative example.

The unit 10T has a photoreceptor 1T. A charging roll (one example of the charging section) 2T that charges the surface of the photoreceptor 1T, an exposing device (one example of the electrostatic charge image forming section) 3T that forms an electrostatic charge image by exposing the charged surface with a laser beam, a developing device (one example of the developing section) 4T that develops the electrostatic charge image by supplying a toner to the electrostatic charge image, a first transfer roll (one example of the first transfer section) 5T that transfers the developed toner image onto the intermediate transfer belt 20, and a photoreceptor cleaning device (one example of the cleaning section) 6T that removes the toner remaining on the surface of the photoreceptor 1T after the first transfer are provided in that order around the photoreceptor 1T. The first transfer roll 5T is disposed on the inner side of the intermediate transfer belt 20 and is positioned to face the photoreceptor 1T.

In the description below, operation of applying the toner of the exemplary embodiment and forming a color image on the recording medium P is described by using the operation of the unit 10T as an example.

First, the surface of the photoreceptor 1T is charged by the charging roll 2T. The developing device 3T applies a laser beam onto the charged surface of the photoreceptor 1T in accordance to image data sent from a controller (not illustrated). As a result, an electrostatic charge image of an application pattern of the toner of this exemplary embodiment is formed on the surface of the photoreceptor 1T.

The electrostatic charge image formed on the photoreceptor 1T is rotated to a developing position as the photoreceptor 1T is run. The electrostatic charge image on the photoreceptor 1T is developed and visualized with the developing device 4T at this developing position so as to form a toner image.

A developer that contains at least the toner of this exemplary embodiment and a carrier is stored in the developing device 4T. The toner of this exemplary embodiment is frictionally charged as it is stirred with the carrier in the developing device 4T, and is carried on the developer roll. As the surface of the photoreceptor 1T passes the developing device 4T, the toner electrostatically adheres to the electrostatic charge image on the surface of the photoreceptor 1T, and the electrostatic charge image is thereby developed with the toner. The photoreceptor 1T on which the toner image formed of the toner is formed is continuously run, and the developed toner image on the photoreceptor 1T is conveyed to a first transfer position.

After the toner image on the photoreceptor 1T is conveyed to the first transfer position, a first transfer bias is applied to the first transfer roll 5T. Electrostatic force working from the photoreceptor 1T toward the first transfer roll 5T also works on the toner image, and the toner image on the photoreceptor 1T is transferred onto the intermediate transfer belt 20. The toner remaining on the photoreceptor 1T is removed by the photoreceptor cleaning device 6T and recovered. The photoreceptor cleaning device 6T is, for example, a cleaning blade or a cleaning brush, and is preferably a cleaning brush.

The unit 10Y has a photoreceptor 1Y, a charging roll 2Y, an exposing device 3Y, a developing device 4Y, a first transfer roll 5Y, and a photoreceptor cleaning device 6Y. The unit 10M has a photoreceptor 1M, a charging roll 2M, an exposing device 3M, a developing device 4M, a first transfer roll 5M, and a photoreceptor cleaning device 6M. The unit 10C has a photoreceptor 1C, a charging roll 2C, an exposing device 3C, a developing device 4C, a first transfer roll 5C, and a photoreceptor cleaning device 6C. The unit 10K has a photoreceptor 1K, a charging roll 2K, an exposing device 3K, a developing device 4K, a first transfer roll 5K, and a photoreceptor cleaning device 6K. The photoreceptors 1Y, 1M, 1C, 1K are similar to the photoreceptor 1T, the charging rolls 2Y, 2M, 2C, 2K are similar to the charging roll 2T, exposing devices 3Y, 3M, 3C, 3K are similar to the exposing device 3T, the developing devices 4Y, 4M, 4C, 4K are similar to the exposing device 4T, the first transfer rolls 5Y, 5M, 5C, 5K are similar to the first transfer roll 5T, and the photoreceptor cleaning devices 6Y, 6M, 6C, 6K are similar to the photoreceptor cleaning device 6T. An operation similar to that performed in the unit 10T is also performed in the units 10Y, 10M, 10C, and 10K by using developers that contain color toners. The intermediate transfer belt 20 onto which the toner image formed of the toner of the exemplary embodiment is formed in the unit 10T sequentially passes the units 10Y, 10M, 10C, and 10K, and toner images of respective colors are transferred onto the intermediate transfer belt 20 in a superimposing manner.

The intermediate transfer belt 20 onto which five toner images are transferred and superimposed as the intermediate transfer belt 20 passes the units 10T, 10Y, 10M, 10C, and 10K reaches a second transfer portion constituted by the intermediate transfer belt 20, the counter roll 24 in contact with the inner surface of the intermediate transfer belt 20, and a second transfer roll (one example of the second transfer section) 26 disposed on the image carrying surface side of the intermediate transfer belt 20. Meanwhile, a recording medium P is supplied to a gap where the second transfer roll 26 and the intermediate transfer belt 20 contact each other via a supplying mechanism, and a second transfer bias is applied to the counter roll 24. During this process, an electrostatic force working from the intermediate transfer belt 20 toward the recording medium P acts on the toner images, and the toner images on the intermediate transfer belt 20 are transferred onto the recording medium P.

The recording medium P onto which the toner images have been transferred is conveyed to a thermal fixing device (one example of the thermal fixing section) 28. The thermal fixing device 28 is equipped with a heating source such as a halogen heater, and heats the recording medium P. The surface temperature of the recording medium P when heated by the thermal fixing device 28 is preferably 150° C. or more and 220° C. or less, more preferably 155° C. or more and 210° C. or less, and yet more preferably 160° C. or more and 200° C. or less. As the recording medium P passes the thermal fixing device 28, the color toner images are thermally fixed to the recording medium P.

From the viewpoints of suppressing detachment of the toner of the exemplary embodiment from the recording medium P and improving the fixability of the color image to the recording medium P, the thermal fixing device 28 may be a device that applies heat and pressure, for example, a pair of fixing members (roll/roll or belt/roll) equipped with a heating sources inside. When the thermal fixing device 28 is to apply pressure, the pressure which the thermal fixing device 28 applies to the recording medium P may be lower than the pressure which the pressurizing device 230 applies to the recording medium P2, and may specifically be 0.2 MPa or more and 1 MPa or less.

The recording medium P passes the printing section 300 and thus becomes a recording medium P1 on which color images and the toner of the exemplary embodiment are provided. The recording medium P1 is conveyed toward the pressure-bonding section 200.

The structure of the pressure-bonding section 200 illustrated in FIG. 3 may be the same as that of the pressure-bonding section 200 illustrated in FIG. 2, and the detailed descriptions of the structure and the operation of the pressure-bonding section 200 are omitted.

In the apparatus for producing a printed material according to this exemplary embodiment, the printing section 300 and the pressure-bonding section 200 may be close to each other or distant from each other. When the printing section 300 and the pressure-bonding section 200 are distant from each other, the printing section 300 and the pressure-bonding section 200 are, for example, linked via a conveying section (for example, a belt conveyor) that conveys the recording medium P1.

The apparatus for producing a printed material according to this exemplary embodiment may be equipped with a cutting section that cuts the recording medium into a predetermined size. Examples of the cutting section include a cutting section that is disposed between the printing section 300 and the pressure-bonding section 200 and cuts off a part of the recording medium P1, the part being a region where no toner of the exemplary embodiment is applied; a cutting section that is disposed between the folding device 220 and the pressurizing device 230 and cuts off a part of the recording medium P2, the part being a region where no toner of the exemplary embodiment is applied; and a cutting section that is disposed downstream of the pressure-bonding section 200 and cuts off a part of the pressure-bonded printed material P3, the part being a region not bonded with the toner of the exemplary embodiment.

The apparatus for producing a printed material according to this exemplary embodiment is not limited to a single-sheet type. The apparatus for producing a printed material according to this exemplary embodiment may be of a type that performs a color image forming step, an applying step, and a pressure bonding step on a long recording medium to form a long pressure-bonded printed material, and then cuts the long pressure-bonded printed material into a predetermined size.

Process Cartridge

A process cartridge used in an apparatus for producing a printed material by an electrophotographic method will now be described.

A process cartridge according to an exemplary embodiment is equipped with a developing section that stores the electrostatic charge image developer of the exemplary embodiment and develops an electrostatic charge image on the surface of a photoreceptor into a toner image by using the electrostatic charge image developer, and is detachably attached to the apparatus for producing a printed material.

The process cartridge of this exemplary embodiment may be configured to include a developing section and, if needed, at least one selected from a photoreceptor, a charging section, an electrostatic charge image forming section, a transfer section, and other sections.

An example of the process cartridge is a cartridge in which a photoreceptor, and a charging roll (one example of the charging section), a developing device (one example of the developing section), and a photoreceptor cleaning device (one example of the cleaning section) disposed around the photoreceptor are integrated by a casing. The casing has an opening to allow exposure. The casing has an installation rail, and the process cartridge is installed to the apparatus for producing a printed material by using the installation rail.

EXAMPLES

The exemplary embodiments of the present disclosure will now be described in detail through examples, but the present disclosure is not limited by these examples. In the description below, "parts" and "%" are on a mass basis unless otherwise noted.

Preparation of Dispersion Containing Styrene Resin Particles

Preparation of Styrene Resin Particle Dispersion (St1)
  Styrene: 390 parts
  n-Butyl acrylate: 100 parts
  Acrylic acid: 10 parts
  Dodecanethiol: 7.5 parts
  The above-described materials are mixed and dissolved to prepare a monomer solution.
  In 205 parts of ion exchange water, 8 parts of an anionic surfactant (DOWFAX 2A1™ produced by The Dow Chemical Company; Disodium Lauryl Phenyl Ether Disulfonate) is dissolved, and is dispersed and emulsified by adding the aforementioned monomer solution to obtain an emulsion.
  In 462 parts of ion exchange water, 2.2 part of an anionic surfactant (DOWFAX 2A1™ produced by The Dow Chemical Company; Disodium Lauryl Phenyl Ether Disulfonate) is dissolved. The resulting solution is charged into a polymerization flask equipped with a stirrer, a thermometer, a reflux cooling tube, and a nitrogen inlet tube and is heated to 73° C. under stirring, and the temperature is retained thereat.
  In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump.
  Subsequently, while slow stirring is continued, the polymerization flask is retained at 75° C. for 3 hours, and then the temperature is returned to room temperature.
  As a result, a styrene resin particle dispersion (St1) that contains styrene resin particles having a volume-average particle diameter (D50v) of 174 nm, a weight-average molecular weight of 49 k as determined by GPC (UV detection), and a glass transition temperature of 54° C., and that has a solid content of 42% is obtained.
  The styrene resin particle dispersion (St1) is dried to obtain styrene resin particles, and the thermal behavior in the temperature range of −100° C. to 100° C. is analyzed with a differential scanning calorimeter (DSC-60A produced by Shimadzu Corporation). One glass transition temperature is observed. Table 1 indicates the glass transition temperatures.

Preparation of Styrene Resin Particle Dispersions (St2) to (St13)

Styrene resin particle dispersions (St2) to (St13) are prepared as with the preparation of the styrene resin particle dispersion (St1) except that the monomers are changed as indicated in Table 1.
  In Table 1, the monomers are abbreviated as follows.
  Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA

TABLE 1

| Styrene resin particle dispersion | | | | | | | | | | | |
|---|---|---|---|---|---|---|---|---|---|---|---|
| | Polymerization components (mass ratio) | | | | | | | | D50v of resin particles | Mw | Tg |
| No. | St | BA | 2EHA | EA | 4HBA | AA | MAA | CEA | nm | — | ° C. |
| St1 | 78 | 20 | 0 | 0 | 0 | 2 | 0 | 0 | 174 | 49000 | 54 |
| St2 | 88 | 10 | 0 | 0 | 0 | 2 | 0 | 0 | 170 | 50000 | 76 |
| St3 | 83 | 15 | 0 | 0 | 0 | 2 | 0 | 0 | 172 | 52000 | 65 |
| St4 | 78 | 20 | 0 | 0 | 0 | 0 | 2 | 0 | 177 | 48000 | 57 |
| St5 | 80 | 15 | 0 | 0 | 5 | 0 | 0 | 0 | 172 | 46000 | 55 |
| St6 | 80 | 15 | 5 | 0 | 0 | 0 | 0 | 0 | 174 | 51000 | 54 |
| St7 | 80 | 20 | 0 | 0 | 0 | 0 | 0 | 0 | 169 | 50000 | 54 |
| St8 | 77 | 20 | 0 | 0 | 0 | 0 | 0 | 3 | 168 | 48000 | 54 |
| St9 | 72 | 26 | 0 | 0 | 0 | 2 | 0 | 0 | 172 | 55000 | 43 |
| St10 | 68 | 30 | 0 | 0 | 0 | 2 | 0 | 0 | 173 | 53000 | 35 |
| St11 | 80 | 0 | 20 | 0 | 0 | 0 | 0 | 0 | 171 | 52000 | 56 |
| St12 | 78 | 0 | 20 | 0 | 0 | 2 | 0 | 0 | 167 | 49000 | 56 |
| St13 | 63 | 0 | 0 | 35 | 0 | 2 | 0 | 0 | 169 | 51000 | 54 |

Preparation of Dispersion Containing Composite Resin Particles

Preparation of Composite Resin Particle Dispersion (M1)
  Styrene resin particle dispersion (St1): 1190 parts (solid content: 500 parts)
  2-Ethylhexyl acrylate: 250 parts
  n-Butyl acrylate: 250 parts
  Ion exchange water: 982 parts
  The above-described materials are charged into a polymerization flask, stirred at 25° C. for 1 hour, and heated to 70° C.
  In 75 parts of ion exchange water, 2.5 parts of ammonium persulfate is dissolved, and the resulting solution is added dropwise to the aforementioned polymerization flask over a period of 60 minutes via a metering pump.
  Subsequently, while slow stirring is continued, the polymerization flask is retained at 70° C. for 3 hours, and then the temperature is returned to room temperature.
  As a result, a composite resin particle dispersion (M1) that contains composite resin particles having a volume-average particle diameter (D50v) of 219 nm and a weight-average molecular weight of 219 k as determined by GPC (UV detection) and that has a solid content of 32% is obtained.
  The composite resin particle dispersion (M1) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 2 indicates the glass transition temperatures.

Preparation of Composite Resin Particle Dispersions (M2) to (M21) and (cM1) to (cM3)

Composite resin particle dispersions (M2) to (M21) and (cM1) to (cM3) are prepared as with the preparation of the composite resin particle dispersion (M1) except that the styrene resin particle dispersion (St1) is changed as described in Table 2 or that the polymerization components of the (meth)acrylate resin are changed as described in Table 2.

Preparation of Composite Resin Particle Dispersions (M22) to (M27)

Composite resin particle dispersions (M22) to (M27) are prepared as with the preparation of the composite resin particle dispersion (M1) except that the amounts of 2-ethylhexyl acrylate and n-butyl acrylate used are adjusted.

In Table 2, the monomers are abbreviated as follows.
Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA Preparation of External Additive The following external additives are prepared. HMDS is 1,1,1,3,3,3-hexamethyldisilazane.

Silica particles (S1): silica particles surface-treated with HMDS, sol-gel method silica, number-average particle diameter of primary particles: 128 nm Silica particles (S2): silica particles surface-treated with HMDS, sol-gel method silica, number-average particle diameter of primary particles: 145 nm Silica particles (S3): silica particles surface-treated with HMDS, sol-gel method silica, number-average particle diameter of primary particles: 105 nm Silica particles (S4): silica particles surface-treated with HMDS, fumed silica, number-average particle diameter of primary particles: 420 nm Silica particles (S5): silica particles surface-treated with HMDS, sol-gel method silica, number-average particle diameter of primary particles: 68 nm Silica particles (S6): silica particles surface-treated with HMDS, fumed silica, number-average particle diameter of primary particles: 47 nm Titanium oxide particles (T1): rutile titanium oxide particles surface-treated with n-octyltriethoxysilane, number-average particle diameter of primary particles: 24 nm Titanium oxide particles (T2): rutile titanium oxide particles surface-treated with n-octyltriethoxysilane, number-average particle diameter of primary particles: 42

TABLE 2

Composite resin particle dispersion

| | St resin | | | | | Composite resin particles (or comparative resin particles) | | | |
| | | | | Ac resin | St resin/Ac | D50v of | | | |
| | St resin particle | Polymerization | Tg | Polymerization | resin mass | resin particles | Mw | Tg | |
| No. | dispersion | components | °C. | components | ratio (St:Ac) | nm | — | °C. | °C. |
|---|---|---|---|---|---|---|---|---|---|
| cM1 | St1 | St/BA/AA = 78/20/2 | 54 | 2EHA = 100 | 50:50 | 222 | 230000 | −50 | 54 |
| cM2 | St1 | St/BA/AA = 78/20/2 | 54 | BA = 100 | 50:50 | 225 | 220000 | −53 | 54 |
| cM3 | St12 | St/2EHA/AA = 78/20/2 | 56 | BA = 100 | 50:50 | 224 | 212000 | −53 | 56 |
| M1 | St1 | St/BA/AA = 78/20/2 | 54 | 2EHA/BA = 50/50 | 50:50 | 219 | 219000 | −52 | 54 |
| M2 | St2 | St/BA/AA = 88/10/2 | 76 | 2EHA/BA = 50/50 | 50:50 | 218 | 240000 | −52 | 76 |
| M3 | St3 | St/BA/AA = 83/15/2 | 65 | 2EHA/BA = 50/50 | 50:50 | 220 | 231000 | −52 | 65 |
| M4 | St4 | St/BA/MAA = 78/20/2 | 57 | 2EHA/BA = 50/50 | 50:50 | 221 | 250000 | −52 | 57 |
| M5 | St5 | St/BA/4HBA = 80/15/5 | 55 | 2EHA/BA = 50/50 | 50:50 | 224 | 242000 | −52 | 55 |
| M6 | St6 | St/BA/2EHA = 80/15/5 | 54 | 2EHA/BA = 50/50 | 50:50 | 225 | 233000 | −52 | 54 |
| M7 | St7 | St/BA = 80/20 | 54 | 2EHA/BA = 50/50 | 50:50 | 224 | 243000 | −52 | 54 |
| M8 | St8 | St/BA/CEA = 77/20/3 | 54 | 2EHA/BA = 50/50 | 50:50 | 222 | 260000 | −52 | 54 |
| M9 | St9 | St/BA/AA = 72/26/2 | 43 | 2EHA/BA = 50/50 | 50:50 | 223 | 251000 | −52 | 43 |
| M10 | St10 | St/BA/AA = 68/30/2 | 35 | 2EHA/BA = 50/50 | 50:50 | 220 | 243000 | −52 | 35 |
| M11 | St11 | St/2EHA = 80/20 | 56 | 2EHA/BA = 50/50 | 50:50 | 221 | 249000 | −52 | 56 |
| M12 | St12 | St/2EHA/AA = 78/20/2 | 56 | 2EHA/BA = 50/50 | 50:50 | 227 | 237000 | −52 | 56 |
| M13 | St12 | St/2EHA/AA = 78/20/2 | 56 | 2EHA/HA = 50/50 | 50:50 | 224 | 226000 | −55 | 56 |
| M14 | St13 | St/EA/AA = 63/35/2 | 45 | 2EHA/PA = 50/50 | 50:50 | 224 | 243000 | −45 | 54 |
| M15 | St1 | St/BA/AA = 78/20/2 | 54 | 2EHA/HA = 50/50 | 50:50 | 226 | 270000 | −54 | 54 |
| M16 | St1 | St/BA/AA = 78/20/2 | 54 | 2EHA/BA = 90/10 | 50:50 | 224 | 264000 | −51 | 54 |
| M17 | St1 | St/BA/AA = 78/20/2 | 54 | 2EHA/BA = 80/20 | 50:50 | 226 | 248000 | −52 | 54 |
| M18 | St1 | St/BA/AA = 78/20/2 | 54 | 2EHA/BA = 70/30 | 50:50 | 226 | 260000 | −52 | 54 |
| M19 | St1 | St/BA/AA = 78/20/2 | 54 | 2EHA/BA = 30/70 | 50:50 | 225 | 273000 | −52 | 54 |
| M20 | St1 | St/BA/AA = 78/20/2 | 54 | 2EHA/BA = 20/80 | 50:50 | 224 | 233000 | −52 | 54 |
| M21 | St1 | St/BA/AA = 78/20/2 | 54 | 2EHA/BA = 10/90 | 50:50 | 223 | 243000 | −53 | 54 |
| M22 | St1 | St/BA/AA = 78/20/2 | 54 | 2EHA/BA = 50/50 | 90:10 | 182 | 180000 | −52 | 54 |
| M23 | St1 | St/BA/AA = 78/20/2 | 54 | 2EHA/BA = 50/50 | 80:20 | 190 | 210000 | −52 | 54 |
| M24 | St1 | St/BA/AA = 78/20/2 | 54 | 2EHA/BA = 50/50 | 70:30 | 199 | 223000 | −52 | 54 |
| M25 | St1 | St/BA/AA = 78/20/2 | 54 | 2EHA/BA = 50/50 | 30:70 | 259 | 300000 | −52 | 54 |
| M26 | St1 | St/BA/AA = 78/20/2 | 54 | 2EHA/BA = 50/50 | 20:80 | 300 | 320000 | −52 | 54 |
| M27 | St1 | St/BA/AA = 78/20/2 | 54 | 2EHA/BA = 50/50 | 10:90 | 380 | 331000 | −52 | 54 | nm Preparation of pressure sensitive adhesive particle
Preparation of pressure sensitive adhesive particle (1)
Composite resin particle dispersion (M1): 504 parts
Ion exchange water: 710 parts
Anionic surfactant (DOWFAX 2A1™ produced by The Dow Chemical Company; Disodium Lauryl Phenyl Ether Disulfonate): 1 part The above-described materials are placed in a reactor equipped with a thermometer and a pH meter, and the pH is adjusted to 3.0 by adding a 1.0% aqueous nitric acid solution at a temperature of 25° C. Then, while the resulting mixture is dispersed in a homogenizer (ULTRA-TURRAX T50 produced by IKA Japan) at a rotation rate of 5000 rpm, 23 parts of a 2.0% aqueous aluminum sulfate solution is added. Subsequently, a stirrer and a heating mantle are attached to the reactor. The temperature is elevated at a temperature elevation rate of 0.2° C./minute up to a temperature of 40° C. and then at 0.05° C./minute beyond 40° C. The particle diameter is measured every 10 minutes with MULTISIZER II (aperture diameter: 50 m, produced by Beckman Coulter Inc.). The temperature is retained when the volume-average particle diameter reached 5.0 μm, and 170 parts of the styrene resin particle dispersion (St1) is added thereto over a period of 5 minutes. After completion of addition, a temperature of 50° C. is held for 30 minutes, a 1.0% aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./minute up to 90° C., and the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water over a period of 5 minutes to 30° C.

The cooled slurry is passed through a nylon mesh having an aperture of 15 μm to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently, the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, a pressure sensitive adhesive base particle (1) is obtained. The volume-average particle diameter of the pressure sensitive adhesive base particle (1) is 8.0 μm.

Pressure sensitive adhesive base particle (1): 100 parts
Silica particles (S1): 1.5 parts
Silica particles (S5): 1.5 parts
Titanium oxide particles (T1): 0.7 parts The aforementioned materials are mixed by using a sample mill at a rotation speed of 10000 rpm for 30 seconds. The mixture is then screened through a vibrating screen having an aperture of 45 μm. As a result, a pressure sensitive adhesive particle (1) is obtained.

Using the pressure sensitive adhesive particle (1) as a sample, the thermal behavior in the temperature range of −150° C. to 100° C. is analyzed with a differential scanning calorimeter (DSC-60A produced by Shimadzu Corporation). Two glass transition temperatures are observed. Table 3 indicates the glass transition temperatures.

The temperature T1 and the temperature T2 of the pressure sensitive adhesive particle (1) are measured with the aforementioned measuring method, and the pressure sensitive adhesive particle (1) satisfies formula 1, "10° C.≤T1−T2".

A section of the pressure sensitive adhesive particle (1) is observed with a scanning electron microscope (SEM). A sea-island structure is observed. The pressure sensitive adhesive particle (1) has a core in which island phases are present, and a shell layer in which no island phases are present. The sea phase contains a styrene resin, and the island phases contain a (meth)acrylate resin. The average size of the island phases is determined by the aforementioned measuring method. The average size of the island phases is indicated in Table 3.

The surface roughness Ra of the pressure sensitive adhesive particle (1) is determined by the aforementioned measurement method. The surface roughness Ra is indicated in Table 3.

Preparation of Pressure Sensitive Adhesive Particles (2) to (27)

The pressure sensitive adhesive particles (2) to (27) are prepared as with the preparation of the pressure sensitive adhesive particle (1) except that the composite resin particle dispersion and the styrene resin particle dispersion are changed as indicated in Table 3.

The temperature T1 and the temperature T2 of the pressure sensitive adhesive particles (2) to (27) are measured with the aforementioned measuring method, and all of the pressure sensitive adhesive particles (2) to (27) satisfy formula 1, "10° C.≤T1−T2".

Preparation of Pressure Sensitive Adhesive Particles (c1) to (c3) of Comparative Examples The pressure sensitive adhesive particles (c1) to (c3) are prepared as with the preparation of the pressure sensitive adhesive particle (1) except that the composite resin particle dispersion and the styrene resin particle dispersion are changed as indicated in Table 3.

Preparation of Pressure Sensitive Adhesive Particles (28) to (31)

The pressure sensitive adhesive particles (28) to (31) are prepared as with the preparation of the pressure sensitive adhesive particle (1) except that the external additive is changed as indicated in Table 4.

The temperature T1 and the temperature T2 of the pressure sensitive adhesive particles (28) to (31) are measured with the aforementioned measuring method, and all of the pressure sensitive adhesive particles (28) to (31) satisfy formula 1, "10° C.≤T1−T2".

Preparation of Pressure Sensitive Adhesive Particles (c4) and (c5) of Comparative Examples The pressure sensitive adhesive particles (c4) and (c5) are prepared as with the preparation of the pressure sensitive adhesive particle (1) except that the external additive is changed as indicated in Table 4.

Evaluation of Pressure Sensitive Adhesive Phase Transition

The temperature difference (T1−T3), which is the indicator of how easily the pressure sensitive adhesive particle undergoes pressure-induced phase transition, is determined. For each pressure sensitive adhesive particle sample, the temperature T1 and the temperature T3 are measured with a Flowtester (CFT-500 produced by Shimadzu Corporation), and the temperature difference (T1−T3) is calculated. Table 3 indicates the temperature difference (T1−T3).

Fluctuation Ratio of Bulk Density of Pressure Sensitive Adhesive Particle

The bulk density is measured under the following conditions by using POWDER TESTER PT-S (produced by Hosokawa Micron Corporation).

Amplitude of vibration: 0.9 mm
Vibration time: 180 seconds

Preparation of Stress Powder

Initial powder: A pressure sensitive adhesive particle and a ferrite carrier powder (particle diameter: 35 µm) are mixed at a 1:10 mass ratio, and the resulting mixture is mixed for 2 minutes by using a roll mill. The bulk density observed at this stage is assumed to be a bulk density A (g/cm$^3$)

Stress powder: The initial powder is placed in a developing machine bench of DOCUCENTRE C7550I, and the bench is idled for 60 minutes. The bulk density of the mixed powder that has received the stirring stress as a result of idling is assumed to be a bulk density B (g/cm$^3$).

The fluctuation ratio (%) of the bulk density of the pressure sensitive adhesive particle is as follows: Fluctuation ratio=(bulk density B/bulk density A)×100 A fluctuation ratio of 100% is determined as there is no change in structure. The fluctuation ratio is classified as follows. The results are indicated in Tables 3 and 4.

A: 95% or more
B: 90% or more but less than 95%
C: 80% or more but less than 90%
D: 70% or more but less than 80%
E: Less than 70%

Evaluation of Adhesiveness

An image that includes both characters and photographic images and has an area density of 30% is formed on one surface of a postcard sheet V424 produced by Fuji Xerox Co., Ltd., by using an image forming apparatus, DOCUCENTRE C7550I, produced by Fuji Xerox Co., Ltd, and fixed.

Next, the pressure sensitive adhesive particle is sprayed onto the entire image-formed surface of the postcard so that the amount of the pressure sensitive adhesive particle provided is 6 g/m$^2$, and the postcard is passed through a belt roll-type fixing machine so as to fix the pressure sensitive adhesive particle onto the image-formed surface of the postcard and form a layer of the pressure sensitive adhesive particle. The postcard having a layer of the pressure sensitive adhesive particle on the image-formed surface is folded in two with the image-formed surface being arranged on the inner side by using a sealer, PRESSLE multi II produced by Toppan Forms Co., Ltd., and a pressure is applied to the folded recording medium so as to bond the flaps of the inner-side image-formed surface to each other at a pressure of 90 MPa.

Ten postcards are continuously formed by using the above-described apparatus under the above-described conditions by folding a postcard paper in two with the image-formed surface facing inward and then bonding the image-formed surfaces of the flaps of the postcard sheet.

The tenth postcard is cut in the long side direction at a width of 15 mm to prepare a rectangular test piece, and the test piece is subjected to the 90 degrees peel test. The peeling speed of the 90 degrees peel test is set to 20 mm/minute, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Table 3.

A: 0.8 N or more
B: 0.6 N or more but less than 0.8 N
C: 0.4 N or more but less than 0.6 N
D: 0.2 N or more but less than 0.4 N
E: Less than 0.2 N

TABLE 3

| | Core | | | | | Pressure sensitive adhesive particles | | |
|---|---|---|---|---|---|---|---|---|
| Pressure sensitive adhesive particles | Composite resin particle dispersion | Polymerization components of St resin | Polymerization components of Ac resin | St resin/ Ac resin mass ratio (St:Ac) | Shell layer St resin particle dispersion | D50v µm | Average size of island phases nm | Tg °C. |
| c1 | cM1 | St/BA/AA = 78/20/2 | 2EHA = 100 | 50:50 | St1 | 8.0 | 600 | −50 |
| c2 | cM2 | St/BA/AA = 78/20/2 | BA = 100 | 50:50 | St1 | 8.0 | 550 | −53 |
| c3 | cM3 | St/2EHA/AA = 78/20/2 | BA = 100 | 50:50 | St12 | 11.0 | 570 | −53 |
| 1 | M1 | St/BA/AA = 78/20/2 | 2EHA/BA = 50/50 | 50:50 | St1 | 8.0 | 200 | −52 |
| 2 | M2 | St/BA/AA = 88/10/2 | 2EHA/BA = 50/50 | 50:50 | St2 | 11.0 | 250 | −52 |
| 3 | M3 | St/BA/AA = 83/15/2 | 2EHA/BA = 50/50 | 50:50 | St3 | 11.0 | 280 | −52 |
| 4 | M4 | St/BA/MAA = 78/20/2 | 2EHA/BA = 50/50 | 50:50 | St4 | 11.0 | 240 | −52 |
| 5 | M5 | St/BA/4HBA = 80/15/5 | 2EHA/BA = 50/50 | 50:50 | St5 | 11.0 | 240 | −52 |
| 6 | M6 | St/BA/2EHA = 80/15/5 | 2EHA/BA = 50/50 | 50:50 | St6 | 11.0 | 250 | −52 |
| 7 | M7 | St/BA = 80/20 | 2EHA/BA = 50/50 | 50:50 | St7 | 9.5 | 250 | −52 |
| 8 | M8 | St/BA/CEA = 77/20/3 | 2EHA/BA = 50/50 | 50:50 | St8 | 9.5 | 250 | −52 |
| 9 | M9 | St/BA/AA = 72/26/2 | 2EHA/BA = 50/50 | 50:50 | St9 | 9.5 | 220 | −52 |
| 10 | M10 | St/BA/AA = 68/30/2 | 2EHA/BA = 50/50 | 50:50 | St10 | 9.5 | 230 | −52 |
| 11 | M11 | St/2EHA = 80/20 | 2EHA/BA = 50/50 | 50:50 | St11 | 9.5 | 220 | −52 |
| 12 | M12 | St/2EHA/AA = 78/20/2 | 2EHA/BA = 50/50 | 50:50 | St12 | 9.5 | 230 | −52 |
| 13 | M13 | St/2EHA/AA = 78/20/2 | 2EHA/HA = 50/50 | 50:50 | St12 | 5.8 | 250 | −55 |
| 14 | M14 | St/EA/AA = 63/35/2 | 2EHA/PA = 50/50 | 50:50 | St13 | 5.8 | 350 | −45 |
| 15 | M15 | St/BA/AA = 78/20/2 | 2EHA/HA = 50/50 | 50:50 | St1 | 5.8 | 400 | −54 |
| 16 | M16 | St/BA/AA = 78/20/2 | 2EHA/BA = 90/10 | 50:50 | St1 | 8.0 | 400 | −51 |

TABLE 3-continued

| | Core | | | | | Pressure sensitive adhesive particles | | |
|---|---|---|---|---|---|---|---|---|
| Pressure sensitive adhesive particles | Composite resin particle dispersion | Polymerization components of St resin | Polymerization components of Ac resin | St resin/ Ac resin mass ratio (St:Ac) | Shell layer St resin particle dispersion | D50v μm | Average size of island phases nm | Tg °C. |
| 17 | M17 | St/BA/AA = 78/20/2 | 2EHA/BA = 80/20 | 50:50 | St1 | 8.0 | 300 | −52 |
| 18 | M18 | St/BA/AA = 78/20/2 | 2EHA/BA = 70/30 | 50:50 | St1 | 8.0 | 250 | −52 |
| 19 | M19 | St/BA/AA = 78/20/2 | 2EHA/BA = 30/70 | 50:50 | St1 | 8.0 | 250 | −52 |
| 20 | M20 | St/BA/AA = 78/20/2 | 2EHA/BA = 20/80 | 50:50 | St1 | 8.0 | 300 | −52 |
| 21 | M21 | St/BA/AA = 78/20/2 | 2EHA/BA = 10/90 | 50:50 | St1 | 8.0 | 400 | −53 |
| 22 | M22 | St/BA/AA = 78/20/2 | 2EHA/BA = 50/50 | 90:10 | St1 | 8.0 | 450 | −52 |
| 23 | M23 | St/BA/AA = 78/20/2 | 2EHA/BA = 50/50 | 80:20 | St1 | 8.0 | 400 | −52 |
| 24 | M24 | St/BA/AA = 78/20/2 | 2EHA/BA = 50/50 | 70:30 | St1 | 8.0 | 250 | −52 |
| 25 | M25 | St/BA/AA = 78/20/2 | 2EHA/BA = 50/50 | 30:70 | St1 | 8.0 | 210 | −52 |
| 26 | M26 | St/BA/AA = 78/20/2 | 2EHA/BA = 50/50 | 20:80 | St1 | 8.0 | 230 | −52 |
| 27 | M27 | St/BA/AA = 78/20/2 | 2EHA/BA = 50/50 | 10:90 | St1 | 8.0 | 250 | −52 |

| | Pressure sensitive adhesive particles | | | | | | |
|---|---|---|---|---|---|---|---|
| Pressure sensitive adhesive particles | Tg °C. | Difference in Tg °C. | T3 °C. | Pressure sensitive adhesive phase transition (T1-T3) °C. | Surface roughness Ra μm | Fluctuation ratio of bulk density % | Adhesiveness | Remarks |
| c1 | 54 | 104 | 95 | 3 | 0.034 | A | D | Comparative Example |
| c2 | 54 | 107 | 93 | 4 | 0.033 | A | D | Comparative Example |
| c3 | 56 | 109 | 93 | 4 | 0.031 | A | D | Comparative Example |
| 1 | 54 | 106 | 75 | 15 | 0.032 | A | A | Example |
| 2 | 76 | 128 | 70 | 13 | 0.030 | A | A | Example |
| 3 | 65 | 117 | 78 | 15 | 0.029 | A | A | Example |
| 4 | 57 | 109 | 70 | 10 | 0.030 | A | A | Example |
| 5 | 55 | 107 | 74 | 16 | 0.029 | A | A | Example |
| 6 | 54 | 106 | 73 | 14 | 0.026 | A | A | Example |
| 7 | 54 | 106 | 73 | 13 | 0.028 | A | A | Example |
| 8 | 54 | 106 | 75 | 10 | 0.029 | A | A | Example |
| 9 | 43 | 95 | 75 | 15 | 0.031 | A | A | Example |
| 10 | 35 | 87 | 73 | 15 | 0.031 | A | A | Example |
| 11 | 56 | 108 | 72 | 15 | 0.033 | A | A | Example |
| 12 | 56 | 108 | 75 | 20 | 0.030 | A | A | Example |
| 13 | 56 | 111 | 70 | 15 | 0.029 | A | A | Example |
| 14 | 54 | 99 | 80 | 5 | 0.031 | A | B | Example |
| 15 | 54 | 108 | 81 | 7 | 0.030 | A | B | Example |
| 16 | 54 | 105 | 80 | 10 | 0.034 | A | B | Example |
| 17 | 54 | 106 | 70 | 20 | 0.032 | A | A | Example |
| 18 | 54 | 106 | 75 | 15 | 0.033 | A | A | Example |
| 19 | 54 | 106 | 73 | 15 | 0.032 | A | A | Example |
| 20 | 54 | 106 | 75 | 20 | 0.030 | A | A | Example |
| 21 | 54 | 107 | 80 | 9 | 0.029 | A | B | Example |
| 22 | 54 | 106 | 85 | 5 | 0.033 | A | C | Example |
| 23 | 54 | 106 | 80 | 10 | 0.031 | A | B | Example |
| 24 | 54 | 106 | 75 | 15 | 0.030 | A | A | Example |
| 25 | 54 | 106 | 73 | 13 | 0.033 | A | A | Example |
| 26 | 54 | 106 | 72 | 13 | 0.034 | A | A | Example |
| 27 | 54 | 106 | 72 | 13 | 0.035 | A | A | Example |

TABLE 4

| Pressure sensitive adhesive particles | External additive | | | | | | | | Pressure sensitive adhesive particles | | | Remarks |
|---|---|---|---|---|---|---|---|---|---|---|---|---|
| | First silica particles | | | Second silica particles | | | Titanium oxide particles | | | | | |
| | Type | Number-average particle diameter nm | Added amount | Type | Number-average particle diameter nm | Added amount | Type | Number-average particle diameter nm | Added amount | Surface roughness Ra μm | Fluctuation ratio of bulk density % | Adhesiveness |
| C4 | S3 | 105 | 1.0 | S6 | 47 | 1.0 | T1 | 24 | 0.7 | 0.004 | E | E | Comparative Example |
| C5 | S4 | 420 | 3.0 | S2 | 145 | 3.0 | T2 | 42 | 1.0 | 0.131 | E | E | Comparative Example |
| 1 | S1 | 128 | 1.5 | S5 | 68 | 1.5 | T1 | 24 | 0.7 | 0.032 | A | A | Example |
| 28 | S3 | 105 | 1.5 | S6 | 47 | 1.5 | T1 | 24 | 0.7 | 0.009 | C | C | Example |
| 29 | S1 | 128 | 1.5 | S6 | 47 | 1.5 | T1 | 24 | 0.7 | 0.022 | B | B | Example |
| 30 | S1 | 128 | 1.5 | S6 | 47 | 1.5 | T2 | 42 | 0.7 | 0.059 | B | B | Example |
| 31 | S2 | 145 | 3.0 | S5 | 68 | 1.5 | T2 | 42 | 0.7 | 0.081 | C | C | Example |

Producing Printed Material by Electrophotographic Method

Into a V-type blender, 10 parts of the pressure sensitive adhesive particle (1) and 100 parts of the following resin-coated carrier are placed, and the resulting mixture is stirred for 20 minutes. Then the mixture is screened through a vibrating screen having an aperture of 212 μm to obtain a developer (1).

Resin-Coated Carrier (1)
 Mn—Mg—Sr ferrite particles (average particle diameter: 40 μm: 100 parts
 Toluene: 14 parts
 Polymethyl methacrylate: 2 parts
 Carbon black (VXC72 produced by Cabot Corporation): 0.12 parts Glass beads (diameter: 1 mm, in an amount equal to the amount of toluene) and the above-described materials other than the ferrite particles are mixed, and the resulting mixture is stirred in a sand mill produced by KANSAI PAINT CO., LTD., at a rotation rate of 1200 rpm for 30 minutes. As a result, a dispersion is obtained. This dispersion and the ferrite particles are placed in a vacuum deaerator-type kneader, and the resulting mixture is dried at a reduced pressure under stirring to obtain a resin-coated carrier (1).

An apparatus of a type illustrated in FIG. 3 is prepared as the apparatus for producing a printed material. In other words, an apparatus for producing a printed material, the apparatus being equipped with a five-stand-tandem intermediate transfer-type printing section that performs application of the toner (pressure sensitive adhesive particle) of the exemplary embodiment and formation of color images on a recording medium, and a pressure-bonding section that has a folding device and a pressurizing device is prepared.

The toner (or comparative toner) of this exemplary embodiment, a yellow toner, a magenta toner, a cyan toner, and a black toner are respectively placed in five developing devices in the printing section. Commercially available products produced by Fuji Xerox Co., Ltd., are used as the yellow toner, the magenta toner, the cyan toner, and the black toner.

Postcard paper V424 produced by Fuji Xerox Co., Ltd., is prepared as the recording medium.

The image to be formed on the postcard paper is an image having an area density of 30% in which black characters and a full-color photographic image are both contained. The image is formed on one surface of the postcard sheet.

The amount of the toner of this exemplary embodiment provided is 3 g/m$^2$ in an image-formed region of an image-formed surface of the postcard sheet.

The folding device is a device that folds the postcard sheet in two such that the surface on which the image is formed is arranged on the inner side.

The pressurizing device is to apply a pressure of 90 MPa.

Ten postcards are continuously formed by using the above-described apparatus under the above-described conditions by folding a postcard sheet in two with the image-formed surface facing inward and then bonding the image-formed surfaces of the flaps of the postcard sheet.

The tenth postcard is cut in the long side direction at a width of 15 mm to prepare a rectangular test piece, and the test piece is subjected to the 90 degrees peel test. The peeling speed of the 90 degrees peel test is set to 20 mm/minute, the load (N) from 10 mm to 50 mm is sampled at 0.4 mm intervals after start of the measurement, the average of the results is calculated, and the loads (N) observed from three test pieces are averaged. The average value is 0.8 N or more (classified as "A" in the aforementioned classification).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A pressure sensitive adhesive particle comprising:
 a pressure sensitive adhesive base particle that contains a styrene resin containing styrene and a vinyl monomer other than styrene as polymerization components, and a (meth)acrylate resin containing at least two (meth)acrylates as polymerization components, wherein a mass ratio of the (meth)acrylates relative to a total of polymerization components of the (meth)acrylate resin is 90 mass % or more; and
 an external additive,
 wherein the pressure sensitive adhesive particle has a surface having an arithmetic average roughness Ra within a range of 0.005 μm to 0.100 μm, the pressure sensitive adhesive particle has at least two glass transition temperatures, and a difference between the lowest glass transition temperature and the highest glass transition temperature among the glass transition temperatures of the pressure sensitive adhesive particle is 30° C. or more, a weight-average molecular weight of the (meth)acrylate resin is more than 50,000 to 250,000 or less, and two (meth)acrylates having a largest and a second-largest mass ratios among the at least two (meth)acrylates contained as the polymerization components in the (meth)acrylate resin are (meth)acrylic acid alkyl esters.

2. The pressure sensitive adhesive particle according to claim 1, wherein the surface has an arithmetic average roughness Ra within a range of 0.015 μm to 0.050 μm.

3. The pressure sensitive adhesive particle according to claim 1, wherein the external additive contains silica particles and titanium oxide particles.

4. The pressure sensitive adhesive particle according to claim 3, wherein an amount of the silica particles externally added relative to 100 parts by mass of the pressure sensitive adhesive base particle is within a range of 0.01 to 20 parts by mass, and an amount of the titanium oxide particles externally added relative to 100 parts by mass of the pressure sensitive adhesive base particle is within a range of 0.01 to 20 parts by mass.

5. The pressure sensitive adhesive particle according to claim 3, wherein an amount of the silica particles externally added relative to 100 parts by mass of the pressure sensitive adhesive base particle is within a range of 0.1 to 10 parts by mass, and an amount of the titanium oxide particles externally added relative to 100 parts by mass of the pressure sensitive adhesive base particle is within a range of 0.1 to 10 parts by mass.

6. The pressure sensitive adhesive particle according to claim 1, wherein a mass ratio of styrene is within a range of 60 mass % to 95 mass % of a total of all polymerization components of the styrene resin in the pressure sensitive adhesive base particle.

7. The pressure sensitive adhesive particle according to claim 1, wherein a mass ratio between the two (meth)acrylates contained at the largest mass ratio and the second largest mass ratio among the at least two (meth)acrylates contained as polymerization components of the (meth)acrylate resin in the pressure sensitive adhesive base particle is within a range of 80:20 to 20:80.

8. The pressure sensitive adhesive particle according to claim 1, wherein a difference in the number of carbon atoms of alkyl groups in the two (meth)acrylic acid alkyl esters is within a range of 1 to 4.

9. The pressure sensitive adhesive particle according to claim 1, wherein the vinyl monomer contained as a polymerization component of the styrene resin contains a (meth)acrylate.

10. The pressure sensitive adhesive particle according to claim 1, wherein the vinyl monomer contained as a polymerization component of the styrene resin is selected from n-butyl acrylate and 2-ethylhexyl acrylate.

11. The pressure sensitive adhesive particle according to claim 1, wherein the styrene resin further contains a (meth)acrylate, and the styrene resin and the (meth)acrylate resin contain the same (meth)acrylate as a polymerization component.

12. The pressure sensitive adhesive particle according to claim 1, wherein the (meth)acrylate resin contains 2-ethylhexyl acrylate and n-butyl acrylate as polymerization components.

13. The pressure sensitive adhesive particle according to claim 1, wherein the pressure sensitive adhesive base particle contains a larger amount of the styrene resin than the (meth)acrylate resin by mass.

14. The pressure sensitive adhesive particle according to claim 1, wherein the pressure sensitive adhesive base particle has a sea phase containing the styrene resin and island phases containing the (meth)acrylate resin and being dispersed in the sea phase.

15. The pressure sensitive adhesive particle according to claim 14, wherein the island phases have an average size in a range of 200 nm to 500 nm.

16. The pressure sensitive adhesive particle according to claim 1, wherein the pressure sensitive adhesive base particle has a core that contains the styrene resin and the (meth)acrylate resin, and a shell layer covering the core.

17. The pressure sensitive adhesive particle according to claim 16, wherein the shell layer also contains the styrene resin.

18. The pressure sensitive adhesive particle according to claim 1, wherein a temperature at which the pressure sensitive adhesive particle exhibits a viscosity of 10000 Pa·s at a pressure of 4 MPa is 90° C. or less.

19. The pressure sensitive adhesive particle according to claim 1, wherein the pressure sensitive adhesive base particle has a core and a shell layer covering the core, and the core has a sea phase containing the styrene resin and island phases containing the (meth)acrylate resin and being dispersed in the sea phase.

20. A method for producing a printed material, the method comprising:

using the pressure sensitive adhesive particle according to claim 1 and applying the pressure sensitive adhesive particle onto a recording medium; and folding the recording medium and pressure-bonding the folded recording medium, or pressure-bonding the recording medium and another recording medium placed on top of each other.

21. A printed material comprising:

recording media placed on top of each other and bonded with each other at opposing surfaces with the pressure sensitive adhesive particle according to claim 1.

* * * * *